(12) United States Patent
Zhang et al.

(10) Patent No.: US 11,652,883 B2
(45) Date of Patent: May 16, 2023

(54) ACCESSING A SCALE-OUT BLOCK INTERFACE IN A CLOUD-BASED DISTRIBUTED COMPUTING ENVIRONMENT

(71) Applicant: Panzura, Inc., Campbell, CA (US)

(72) Inventors: Qian Zhang, Sunnyvale, CA (US); Jian Xing, Pleasanton, CA (US); Pu Paul Zhang, San Jose, CA (US)

(73) Assignee: Panzura, LLC, San Jose, CA (US)

( * ) Notice: Subject to any disclaimer, the term of this patent is extended or adjusted under 35 U.S.C. 154(b) by 215 days.

(21) Appl. No.: 16/808,199

(22) Filed: Mar. 3, 2020

(65) Prior Publication Data

US 2020/0204626 A1 Jun. 25, 2020

Related U.S. Application Data

(63) Continuation-in-part of application No. 16/216,890, filed on Dec. 11, 2018, now Pat. No. 11,178,246.

(60) Provisional application No. 62/722,892, filed on Aug. 25, 2018.

(51) Int. Cl.
| | |
|---|---|
| *G06F 16/13* | (2019.01) |
| *H04L 67/1097* | (2022.01) |
| *G06F 9/54* | (2006.01) |
| *G06F 3/06* | (2006.01) |
| *H04L 67/01* | (2022.01) |
| *H04L 67/568* | (2022.01) |

(52) U.S. Cl.
CPC .......... *H04L 67/1097* (2013.01); *G06F 3/061* (2013.01); *G06F 3/067* (2013.01); *G06F 3/0661* (2013.01); *G06F 9/547* (2013.01); *G06F 16/134* (2019.01); *H04L 67/01* (2022.05); *H04L 67/568* (2022.05);

(58) Field of Classification Search
CPC . H04L 67/1097; H04L 67/2842; H04L 67/42; G06F 3/0661; G06F 3/061; G06F 3/067; G06F 9/547; G06F 16/134; G06F 16/13; G06F 16/25
USPC ........................................................ 709/220
See application file for complete search history.

(56) References Cited

U.S. PATENT DOCUMENTS

| | | | |
|---|---|---|---|
| 9,639,546 B1 * | 5/2017 | Gorski | G06F 16/289 |
| 10,564,870 B1 * | 2/2020 | Greenwood | G06F 3/0647 |
| 2012/0179874 A1 * | 7/2012 | Chang | G06F 9/45558 718/1 |
| 2015/0189033 A1 * | 7/2015 | Han | H04L 67/288 709/203 |

(Continued)

*Primary Examiner* — Younes Naji
*Assistant Examiner* — Da T Ton
(74) *Attorney, Agent, or Firm* — Mark Spiller

(57) ABSTRACT

The disclosed embodiments disclose techniques for accessing a scale-out block interface in a cloud-based distributed computing environment (CBDCE). During operation, an instance of a block device service (BDS) receives a data request from a client. The BDS instance translates the data request into a set of data block accesses, and then sends the translated data request to a data processing layer service (DPL). The DPL instance services the data request using a set of data operations that leverage one or more of a distributed cache, a distributed database, and a cloud storage system. The BDS service leverages the DPL instance to provide to the client an abstraction of a highly-available block storage device with unlimited storage space via the scale-out block interface.

14 Claims, 12 Drawing Sheets

(56) References Cited

U.S. PATENT DOCUMENTS

| | | | | |
|---|---|---|---|---|
| 2015/0254272 A1* | 9/2015 | Regni | ............... | G06F 16/2379 |
| | | | | 707/694 |
| 2017/0222890 A1* | 8/2017 | Dippenaar | ......... | H04L 67/1097 |
| 2019/0340374 A1* | 11/2019 | Gupta | ................ | G06F 3/067 |
| 2020/0021560 A1* | 1/2020 | Hefley | ................ | G06F 9/54 |

* cited by examiner

ACCESSING A SCALE-OUT BLOCK INTERFACE IN A CLOUD-BASED DISTRIBUTED COMPUTING ENVIRONMENT

RELATED APPLICATION

This application is a continuation-in-part application of pending U.S. patent application Ser. No. 16/216,890 filed on 11 Dec. 2018 by inventors Jian Xing, Qian Zhang, and Pu Paul Zhang, entitled "Managing Cloud-Based Storage Using a Time-Series Database", which claims benefit of U.S. Provisional Patent Application No. 62/722,892, by inventors Jian Xing, Qian Zhang, and John Richard Taylor, entitled "Managing Cloud-Based Storage Using a Time-Series Database," filed 25 Aug. 2018. The contents of both of the above-referenced applications are hereby incorporated by reference.

BACKGROUND

Field of the Invention

This disclosure generally relates to techniques for providing flexible and extensible network storage systems. More specifically, this disclosure relates to techniques for managing storage and compute operations in a cloud computing environment.

Related Art

Enterprise data centers typically include large numbers of storage devices that can be accessed using high-speed networks. However, the management overhead involved in maintaining a large number of storage devices can become substantial. For instance, maintaining data consistency, redundancy, and storage system performance in the presence of hard drive failures can involve substantial time, effort, and expertise.

Cloud-based computing storage vendors attempt to simplify storage management by providing large-scale remote network computing and storage solutions. Such vendors can leverage economies of scale to provide extensive and flexible computation services and data storage capacity that can be leased and accessed by clients. Clients can leverage such cloud-based solutions to offload storage management overhead and to quickly and easily increase their data storage capacity and computing capabilities on an as-needed basis. However, the advantages of flexible cloud-based computing capabilities make them a valuable commodity that can command premium pricing. Furthermore, implementing and managing a cloud-based environment in which distributed services can interact in a scalable and flexible manner is challenging. For instance, distributed services that do not interact effectively may provide inadequate client performance and be unable to detect and manage sudden, unexpected increases in business and/or storage traffic.

Hence, what is needed are techniques for managing cloud-based computing capabilities without the above-described problems of existing techniques.

SUMMARY

The disclosed embodiments disclose techniques for accessing a scale-out block interface in a cloud-based distributed computing environment (CBDCE) that comprises multiple compute nodes, a distributed database, and cloud storage system. In this environment, multiple instances of a data processing layer service (DPL) manage data accesses to the distributed cache and the cloud storage system, and a block device service (BDS) presents the scale-out block interface to clients. During operation, an instance of the BDS service receives a data request from a client. The BDS instance translates the data request into a set of data block accesses, and then sends the translated data request to a DPL instance. The DPL instance services the data request using a set of data operations that leverage one or more of the distributed cache, the distributed database, and the cloud storage system. The BDS service leverages the DPL instance to provide to the client an abstraction of a highly-available block storage device with unlimited storage space via the scale-out block interface.

In some embodiments, the client is an application that presents a filesystem-level request to a host operating system of a host compute node. The host operating system translates the filesystem-level request into a disk-level command that is forwarded to the BDS instance (as the data request). The BDS instance converts the disk-level command into data block device requests that match the API of the DPL service.

In some embodiments, the DPL instance tracks a set of mode identifiers, offsets, and data fingerprints associated with data requests, uses this tracked data to determine how to access metadata and data blocks associated with the data request in the distributed cache, the distributed database, and the cloud storage system.

In some embodiments, the CBDCE supports simultaneous accesses for multiple, distinct scale-out block devices; access to each distinct scale-out block device is managed by a separate, distinct BDS instance. Each DPL instance can simultaneously provide data access for multiple BDS instances, and the DPL instances ensure that data requests for different scale-out block devices remain separate and distinct.

In some embodiments, sending a data request from a BDS instance to a DPL instance involves contacting a data agent service that tracks the set of currently executing DPL service instances and links incoming requests from BDS instances with host DPL service instances. The data agent service determines that no existing DPL instance has sufficient bandwidth to support an additional BDS instance, and in response (1) instantiates a new DPL instance to support additional BDS instances in the CBDCE and (2) establishes a connection between the BDS instance and the new DPL instance to service the data request. Note that the distributed cache, the DPL service, the distributed database and other distributed, scalable services executing in the CBDCE can be scaled out to handle an arbitrarily large number of BDS instances.

In some embodiments, the data agent service determines that an existing DPL instance has sufficient bandwidth to support an additional BDS instance and establishes a connection between the BDS instance and that DPL instance to service the data request. The data agent service rebalances BDS instance requests to DPL instances over time to ensure that all of the DPL instances in the CBDCE have balanced workloads.

In some embodiments, the data agent service co-locates the client and the BDS instance that the client is accessing on the same compute node to reduce data request latency and overhead. The data agent service may also ensure that the DPL instance that is accessed by this BDS instance is on a separate, distinct compute node to prevent any issues associated with resource contention between the DPL instance and either or both of the BDS instance and the client.

In some embodiments, a BDS instance maintains a keep-alive protocol with the DPL instance that it is accessing to promptly detect any failure in the DPL instance. If the DPL instance fails, the data agent service can identify a second available DPL instance and refer the BDS instance to that second available DPL instance.

In some embodiments, the client is an ELK stack instance that collects data upon which to perform search operations. The ELK stack instance generates and operates upon a data index that is stored in the cloud storage system via the scale-out block interface provided by the BDS instance. Portions of the data index that are currently being operated upon by the ELK stack instance are cached in the distributed cache.

In some embodiments, multiple clients simultaneously access the BDS service to simultaneously access a same scale-out block device, with data consistency for the same scale-out block device being managed at the client level by the multiple clients.

Figure 1:
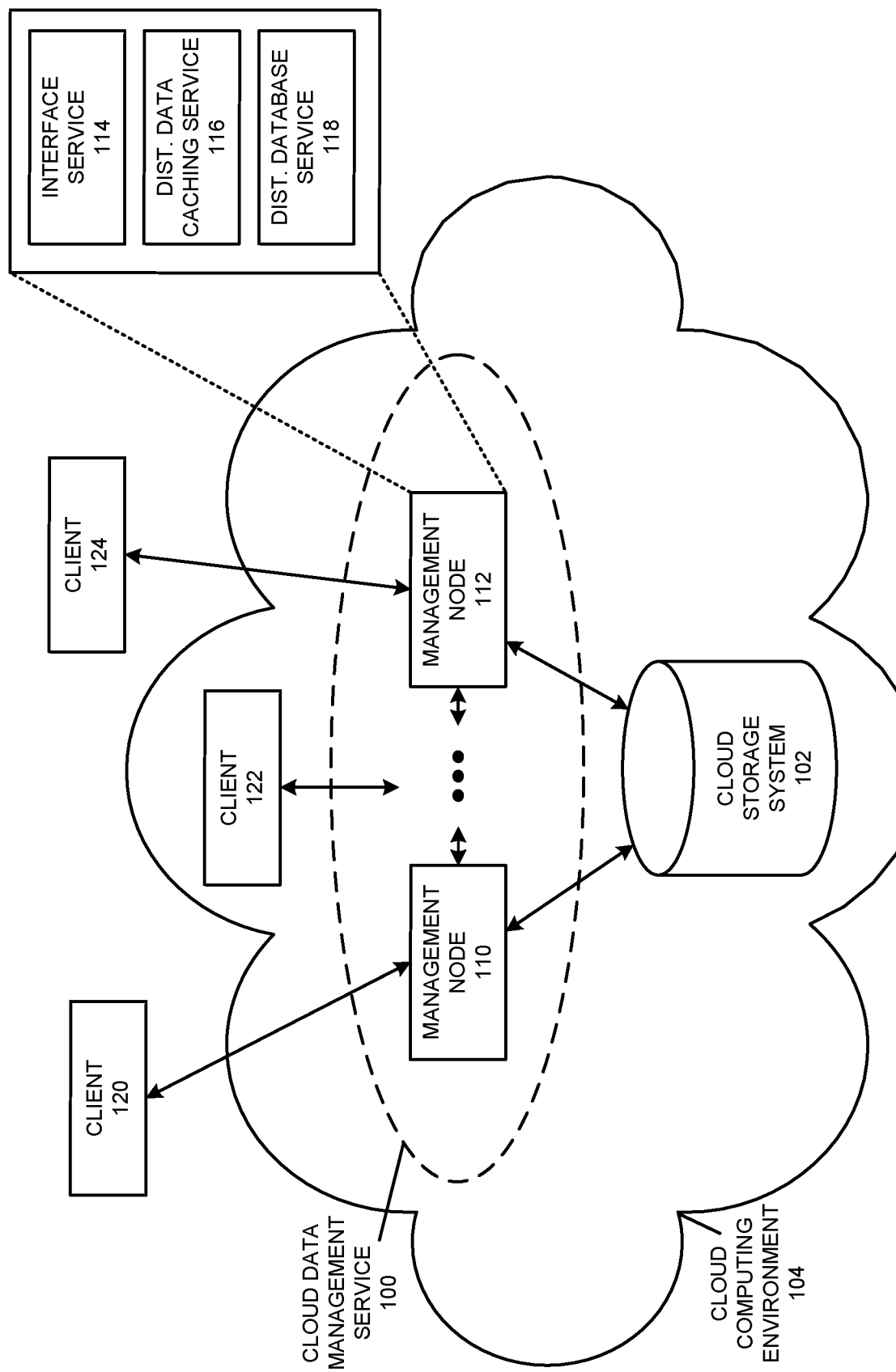
FIG. 1 illustrates an exemplary scenario in which a cloud data management service manages data flows between clients and a cloud storage system in accordance with an embodiment.

Table 1 illustrates a set of data this is divided into 4 GByte volume ranges in accordance with an embodiment.

Table 2 illustrates a summary of the set of operations that are performed during an exemplary write to the distributed cache in accordance with an embodiment.

Table 3 illustrates an example of an issue that can arise due to stale metadata in the distributed cache in accordance with an embodiment.

Table 4 illustrates a second example of an issue that can arise due to stale metadata in the distributed cache in accordance with an embodiment.

Table 5 illustrates pseudocode for an exemplary write to a distributed cache that supports metadata versioning in accordance with an embodiment.

Table 6 illustrates pseudocode for an exemplary read-triggered write to a distributed cache that supports metadata versioning in accordance with an embodiment.

Table 7 illustrates pseudocode for an exemplary read from a distributed cache that supports metadata versioning in accordance with an embodiment.

Table 8 illustrates the keys that are used to perform lookup operations in the distributed cache in accordance with an embodiment.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Leveraging Cloud-Based Storage

Storage scalability can become problematic for enterprises when data needs out-scale the capabilities of a datacenter. While storage capacity can be over-provisioned, failures or unanticipated volumes of data traffic can cause situations where new storage devices cannot be brought online quickly enough to satisfy data demands. A number of "cloud-based storage" vendors (also sometimes referred to as "cloud storage providers") attempt to simplify storage management by providing large-scale network storage solutions. Such vendors leverage economies of scale to provide data centers with extensive data storage capacity that can then be rented and accessed by clients, thereby allowing clients to offload storage management overhead and easily increase their data storage allotment on an as-needed basis. Clients can store and retrieve data via well-known data access APIs (application programming interfaces) (e.g., the Amazon S3 API).

The advantages of flexible cloud-based data storage capacity make it a valuable commodity that can command premium pricing. For instance, cloud computing vendors may provide clients with an initial fixed amount of data storage space that can grow with client needs, and then charge substantial storage fees when additional flexible storage space is actually used. Such additional storage costs may be worth the additional expense for clients experiencing a sudden increase in business and/or storage traffic (especially in comparison with running out of storage space!), but can substantially increase client costs. Cloud computing vendors providing these services have incentive to increase the value of storage capabilities by adding additional capabilities (e.g., improving durability, availability and scalability, and building in-cloud machine learning capabilities that can operate upon data stored in their cloud storage services and hence encourage clients to use more cloud data storage capacity), but do not have much incentive to apply techniques that reduce the amount of data that is stored in a cloud storage services (because this would reduce their profits).

In some embodiments, a distributed cloud data management system operates as a layer on top of a cloud storage system. This cloud data management system provides a number of additional services that are not provided by the underlying cloud storage system.

FIG. 1 illustrates an exemplary scenario in which a cloud data management service 100 manages data flows between clients 120-124 and a cloud storage system 102. Cloud storage system 102 and cloud data management service 100 operate in a cloud computing environment 104, and can provide data services to clients that execute both inside (client 122) and outside (clients 120 and 124) of the cloud computing environment 104. Cloud data management service 100 comprises multiple management nodes 110-112 that execute services that interact with each other and cloud storage system 102 to provide data management services and service client requests.

In some embodiments, each management node (e.g., 110-112) may execute multiple services that comprise one or more "layers of functionality." For instance, an interface service 114 (sometimes also referred to as the access layer, or access service) may execute a number of "docker containers" that can accept client data requests via a wide range of different protocols (e.g., including, but not limited to, a native cloud object protocol such as the Amazon S3 interface, as well as other data access APIs such as Hadoop, NTFS, and CIFS). Docker containers (or "dockers") provide a lighter-weight solution (as compared to separate virtual machines, or "VM"s) that facilitates automating the deployment of multiple related applications (sometimes referred to as "microservices") inside distinct software containers that all operate within a single virtual machine and can communicate with each other using standard networking protocols (e.g., via Linux namespaces and IP-layer network protocols). Allowing independent containers to run within a single virtual machine avoids the cost and overhead of starting and maintaining multiple virtual machines. Note that such docker containers execute in isolation and leverage operating system kernel resources to communicate; containers can be provisioned and provided with an abstraction of their own process space and interfaces, and can be constrained to use a specific defined amount of resources (e.g., CPU, memory, and network or other I/O bandwidth).

In some embodiments, a distributed database in the cloud computing environment can be leveraged as a time-series database by a cloud data management service that provides additional capabilities and abstractions for the cloud storage system. The cloud data management service can also use the distributed database to provide multi-node management and support for services that execute in the cloud environment. The cloud data management service may also manage a distributed journaling service that ensures that new data and requests are logged and can be recovered across a range of possible errors or failures. These techniques are described in more detail in pending U.S. patent application Ser. No. 16/216,890, filed 11 Dec. 2018 by inventors Jian Xing, Qian Zhang, and Pu Paul Zhang, entitled "Managing Cloud-Based Storage Using a Time-Series Database", which is incorporated by reference in its entirety.

In some embodiments, additional cloud computing infrastructure provides additional scalability, performance, and capabilities to distributed computing services. More specifically, the following sections disclose techniques for:
- enabling a distributed cache service that improves the performance of data accesses for distributed services;
- providing a scale-out block interface that allows cloud-based services to access cloud storage via a block interface;
- reducing the resources consumed by multiple ELK application instances by providing transparent, extensible multi-tenant ELK capabilities; and
- adapting computing resources in real-time based on service requests and needs.

Distributed Cache Service

Application performance often depends on low-latency, high-bandwidth data accesses. While cloud-based storage systems provide the benefits of expandable and reliable data storage capabilities, latency in cloud-based storage system accesses can impact application performance and thus user satisfaction. For instance, writing data to a cloud-based distributed database stores data redundantly and reliably but requires confirmation by a quorum of distributed database service instances, which increases confirmation delay. The above-disclosed data journaling service techniques ensure that received data is not lost while it is being written, but do not provide convenient application access to such data during the write process. Read accesses from a distributed database are faster than writes (because any distributed database instance can be queried for the data, and no quorum is needed for reads), but still involve lookup- and cloud-storage-related latency.

In some embodiments, a distributed, cloud-based cache service provides a cache layer that speeds up data accesses in a cloud computing environment. For instance, a set of cache service instances distributed across multiple compute nodes can leverage the memory and/or storage of their host compute nodes to cache data that is accessed by other services. Such caching techniques can provide significant performance improvements over the previously-described techniques in which metadata is stored in a distributed database and data is stored in a cloud storage system (e.g., without any caching). For example, the need to add writes to the distributed database commit log and confirm writes across a quorum of distributed database service instances can result in significant write delays. Similarly, reading data from cloud storage systems can involve substantial latency. Hence, inserting a multi-layer distributed cache before a distributed database and cloud storage system preserves the distributed nature and reliability of the underlying storage services while substantially improving performance. Cloud storage systems serve as the backing store for this distributed cache; data entering this cache is still written through to cloud storage systems consistently, but can be accessed more quickly via the distributed cache when present in the cache.

In some embodiments, the set of distributed cache instances changes over time; any given instance may join or leave the system at any time. For instance, a distributed cache instance may no longer be available if its host node goes down, and another node may be allocated to host a replacement distributed cache instance. Furthermore, the set of distributed cache instances may expand or contract over time based on factors that include, but are not limited to, the distributed cache load, the availability and cost of compute resources, the average load in the compute cluster, and the set of applications currently executing in the environment. Operating a distributed cache in such an environment involves tracking the set of participating distributed cache instances and maintaining a mapping of the entities that comprise the distributed cache infrastructure as well as how cached data is distributed across the participating distributed cache instances.

The distribution and lookup of data across multiple distributed cache nodes can be complicated by the loss and/or addition of cache nodes over time. Minimizing the changes and overhead that are needed in the cache system when extending or shrinking the set of cache nodes/instances improves the performance of the cache. Typically, services accessing a distributed cache use a cache mapping to determine which cache node should be accessed for a specific requested piece of data. In some embodiments, distributed hashing techniques such as "consistent hashing" deterministically map data across cache nodes. Traditional hashing techniques determine target caches based on a modulus of the number of cache nodes require a large set of data to be rehashed when the set of available nodes changes, which is very unfavorable. In contrast, consistent-hashing techniques provide an abstraction in which hash values for both the data values and the cache node identifiers are pseudo-randomly distributed across a space that can be visualized as the edge of a circle (where the edge of the circle comprises points that can correspond to hash key mappings). For look-ups, the hash key for the target data is determined as a specific point on the circle, and then the edge of the circle is traversed until the hash value for a cache node is found; the identified cache node is the location for the target data. Calculating a target cache node for a new data object involves calculating a hash key for the new data object, finding the location of that hash key on the circle, and then traversing the circle clockwise until the hash value for a target cache node is encountered; this target cache node will be the recipient of the new data object. In such a mapping, a cache node's "bucket" consists of the data associated with all of the hash keys that map between its own hash key on the circle and the next preceding cache node hash key in the circle. If a cache node becomes unavailable, its hash key is removed from the mapping, and the data that it was previously responsible for (i.e., its bucket) is now managed by the cache node whose hash key is found next when continuing to traverse clockwise on the circle. Hence, a lost cache node's bucket(s) would need to be moved (and/or reloaded on the next access), but the data in other cache nodes' buckets is not affected. Similarly, new nodes being added to the mapping may require some data that was previously mapped to another cache node that handled that portion of the circle to a new node, but on average the addition and loss of nodes involves redistributing only on the order of 1/n portion of cache data between cache nodes, where n is the number of cache nodes (in contrast with redistributing most or all of the data, as in traditional hashing techniques). In some embodiments, multiple different hash functions may be used simultaneously to map each cache node to multiple locations on the circle, thereby splitting the load for failed cache nodes more evenly across the set of participating cache nodes.

Figure 2A:
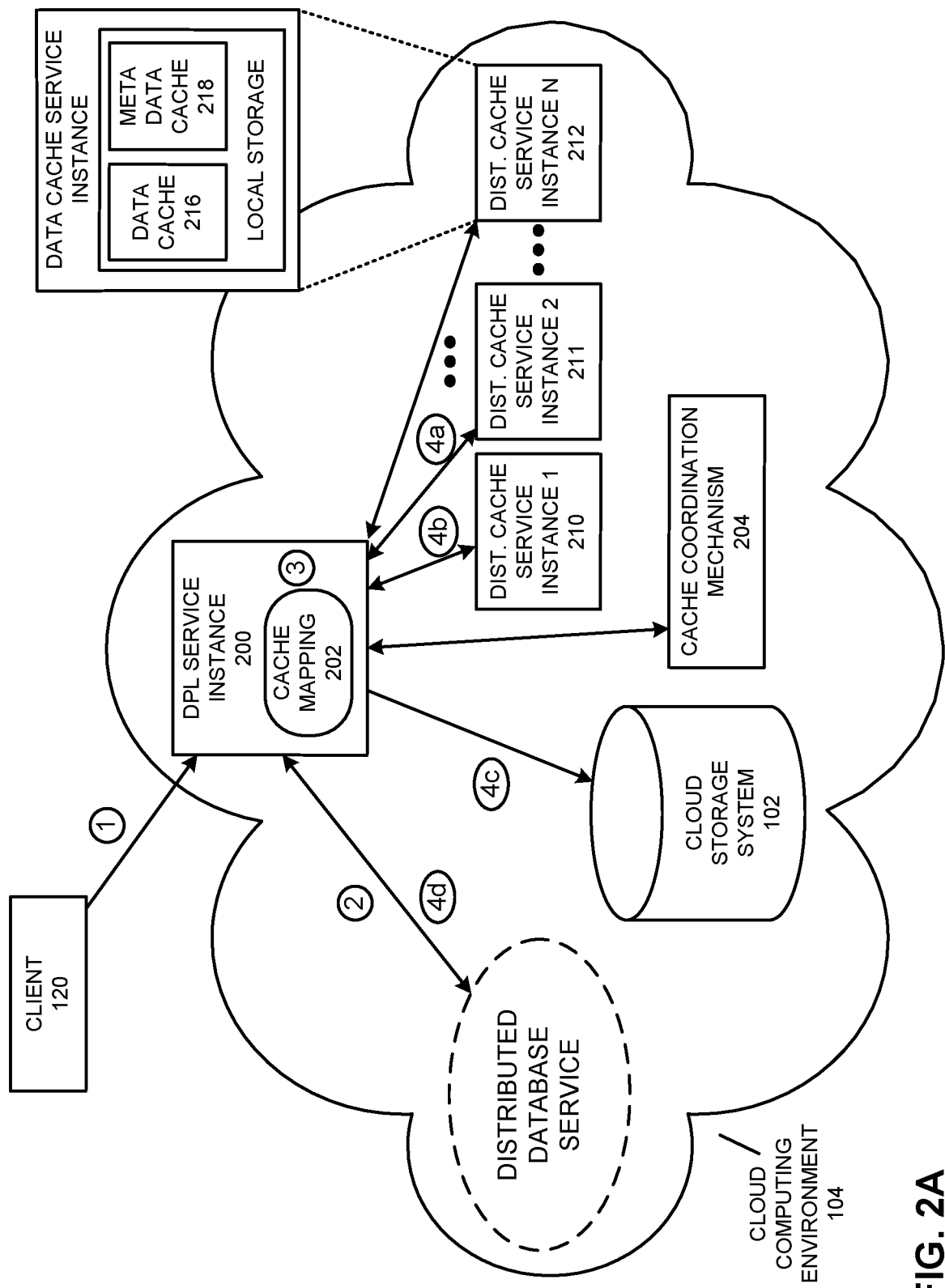
FIG. 2A illustrates an exemplary scenario in which a data processing layer (DPL) service instance accesses a set of distributed cache service instances during a write operation in accordance with an embodiment.

FIG. 2A illustrates an exemplary scenario in which one data processing layer (DPL) service instance 200 (of many, others not shown) accesses a set of distributed cache service instances (210-212) during a write operation. During operation, DPL service 200 loads and maintains an updated cache mapping 202 for the set of distributed cache service instances. For instance, DPL service 200 may communicate with a cache coordination mechanism 204 (e.g., a high-speed distributed key-value store such as etcd, which is typically smaller and faster than a full-sized distributed database) to determine a location of a reference cache mapping that is updated whenever the set of distributed cache service instances changes. Cache coordination mechanism 204 communicates with the distributed cache service instances to update the reference mapping whenever existing cache service instances fail (or are deallocated) and/or new cache service instances are added to the system; cache coordination mechanism 204 updates the reference mapping accordingly in response to such changes. The reference mapping may be stored in and accessed from different locations in the distributed cache infrastructure that include, but are not limited to, one or more of cache coordination mechanism 204, cloud storage system 102, and a distributed database service 220. Cache mapping 202 may include, but is not limited to, a list of the set of cache nodes that are currently active in the cluster, the range(s) of hash values that each cache node is managing, the storage capacity of each cache node, and other logistical and/or tracking information. Note that some cache node failures may be transitory and not trigger updates to the reference mapping. For instance, a cache node instance crashing may not result it in being dropped from the distributed cache for some initial time interval; instead that section of the distributed cache may just not be available until that cache node instance comes up again. Because the distributed cache primarily benefits performance, the temporary loss of cache nodes does not lead to any data starvation or access failures. However, if a longer-term failure is detected (e.g., the cache instance cannot be re-instantiated on the same compute node, and a replacement cache instance is instantiated on a replacement compute node), a resulting reconfiguration may prompt an update to the reference mapping.

The instances of the DPL service collectively serve as an interface for accessing cloud storage system 102, with each individual DPL service instance using its respective local cache mapping to access the cache nodes of the distributed cache service to perform data operations requested by clients. The set of DPL service instances ensure that distinct data that is received from different clients is kept separate by partitioning data into specific fixed-size ranges called "modes" that are managed as objects internally. For example, each such mode range may span 4 GBytes and be identified with an mode identifier (e.g., a 64-bit integer) that is globally unique across all of the participating DPL service instances. Client accesses are typically associated with a specific given volume range and an offset into that volume range. Every time a client writes data into a new volume range the receiving DPL service instance assigns a new unique mode identifier number for the new range. For instance, mode numbers may be monotonically increasing, and a DPL service instance receiving a request to store a new volume range may contact the distributed database and/or some other mechanism (e.g., an etcd service) to determine the next valid mode number that it will then assign to the new data. Rnode information is recorded in the distributed database; a different, unique mode value is assigned to each different volume range to ensure that different volumes cannot be confused, even when accessed by different DPL service instances in different geographic locations.

Each distributed cache service instance may leverage multiple levels of local storage into both a data cache 216 and a metadata cache 218 that is used to look up the data. For instance, each distributed cache service instance may incorporate either or both local memory and solid-state drive (SSD) resources on its host node into a multi-level cache. Data accesses typically involve both a metadata and data lookup in the cache; the metadata lookup determines how the requested address is mapped to a data fingerprint, and the fingerprint is then used to access the requested data block. To simplify cache operations, the data caches may be configured to use a single standard granularity for data blocks (e.g., 128 Kbyte blocks). In one exemplary scenario, for a block size of 128 Kbytes, a 4 GByte mode size would span on the order of 32,000 blocks, and a 4 TByte volume would span 1024 modes. In practice, the number of blocks contained in an mode is an implementation design trade-off that impacts the number of data and metadata entries in the metadata cache and the distributed database. The following examples describe exemplary read and write operations that leverage a distributed cache service.

Consider an exemplary write operation (in the context of FIG. 2A) in which DPL service instance 200 receives a block of new data from client 120 to be stored to cloud storage system 102 (Operation 1). Client 120 previously has written 8 GB of related data to cloud storage system 102 via DPL service instance 200, and this previous data was divided into two 4 GByte volume ranges that were assigned to two distinct, unique mode identifiers (model and rnode2, as illustrated in Table 1). DPL service instance 200, upon determining that the additional data block exceeds this initial 8 GB range, allocates a new volume range and mode, and contacts the distributed database service 220 to determine a new unique mode number, rnode3 (Operation 2). DPL service instance 200 then (Operation 3): (1) calculates a fingerprint fp1 for the new data block (e.g., performing a SHA256 hash upon the data contents of the data block to generate a 32 byte identifier for the block); (2) uses consistent-hashing techniques in conjunction with cache mapping 202 to determine that calculated fingerprint fp1 maps to distributed cache service instance #2 211; and (3) uses consistent-hashing techniques in conjunction with cache mapping 202 to determine that an "ridentifier value" derived from at least one of rnode3 and the specified offset map to distributed cache service instance #1 210. After determining the appropriate target cache instances, DPL service instance 200: (1) submits fp1 and the new data block as a cache entry to the data cache 216 of distributed cache service instance #2 211 (Operation 4a); and (2) writes rnode3, offset1 (the offset of the new block into the volume range for rnode3), and fp1 as a metadata cache entry into the metadata cache 218 of distributed cache service instance #1 210 (Operation 4b).

TABLE 1

| [0 - 4 GB) | rnode1 |
| [4 GB - 8 GB) | rnode2 |
| [8 GB - 12 GB) | rnode3 (new) |

TABLE 2

| store (fp1, data block) –> dcache of DCS #2 |
| store (rnode3,offset1,fp1) –> mcache of DCS #1 |
| store (fp1, data block) –> cloud storage system |
| store (mode3,offset1,fp1) –> distributed database |
| store data block + client request in dist. journal |

Cloud storage system 102 and distributed database service 220 serve as the backing store for the cached data and metadata, respectively. Hence, DPL service instance 200 also writes an entry for fp1 and the new data block to cloud storage system 102 (Operation 4c) and a metadata entry linking rnode3, offset1, and fp1 into the distributed database service (Operation 4d). In addition, the client request is also still written to the distributed journaling service (as discussed in the above-referenced materials, but not shown in FIG. 2A), to ensure that client requests are preserved in case DPL service instance 200 fails at some point after receiving the client request but before the new data and metadata have been written to the cache and/or committed to the distributed database and cloud storage system. Because of this, the writes to cloud storage system 102 and the distributed database service can be non-blocking (asynchronous), thereby improving performance. The preceding described operations are summarized in Table 2. Note that while this example illustrates the creation of a new mode, many write operations result in writing a new block to a previously unused offset into an existing mode's volume range.

Figure 2B:
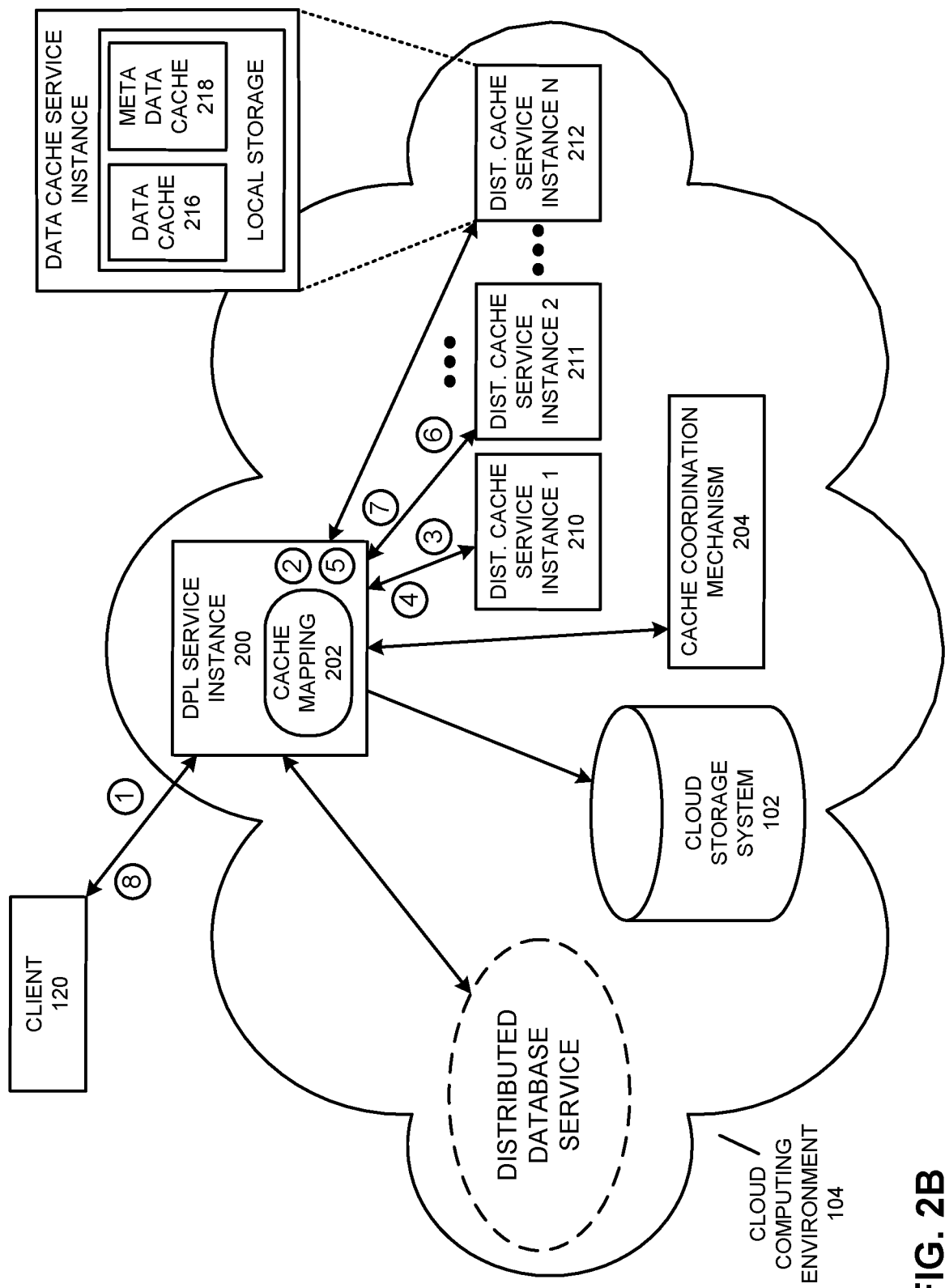
FIG. 2B illustrates an exemplary scenario in which a data processing layer (DPL) service instance accesses a set of distributed cache service instances during a read operation in accordance with an embodiment.

FIG. 2B illustrates an exemplary scenario in which DPL data service instance 200 accesses distributed cache service instances (210-212) during a read operation (of the same data block that was written above for FIG. 2A). This time DPL service instance 200 receives a read request from client 120 (Operation 1). The read request includes (or can be used to determine) an mode number and an offset into that mode's range (in this example, offset1 into rnode3). DPL service instance 200 uses consistent hashing techniques and cache mapping 202 to determine that an ridentifier associated with at least one of (or a combination of) rnode3 and offset1 maps to distributed cache service instance #1 210 (Operation 2), and then sends (rnode3,offset1) to that instance 210 as keys for a metadata cache lookup (Operation 3). If this metadata entry is still cached in instance 210's metadata cache 218, instance 210 returns the cached fingerprint associated with the data block located at offset1 in rnode3, which is fp1, to DPL service instance 200 (Operation 4), which then: (1) uses consistent hashing techniques and cache mapping 202 to determine that fp1 maps to distributed cache service instance #2 211 (Operation 5); and (2) then sends fp1 to that instance 211 to be used as a key in a data cache lookup (Operation 6). If the corresponding data entry for key fp1 is still in instance 211's data cache 216, instance 211 returns the cached data to DPL service instance 200 (Operation 7), which then returns the requested data to client 120 (Operation 8).

Note that if either the metadata-cache or data-cache lookups miss, DPL service instance 200 instead contacts the backing stores (i.e., one or both of the distributed database service 220 and cloud storage system 102) to retrieve the requested metadata/data (although with additional latency). During this process DPL service instance 200 may also reload the data into the distributed cache service. Note that while FIGS. 2A-2B illustrate DPL service instance 200 as the entity that manages this process, in alternative embodiments the distributed cache service instances may also be configured to access the distributed database service and cloud storage system 102 to perform such look-ups and loads (and also perform pass-through writes during write operations).

Figure 3:
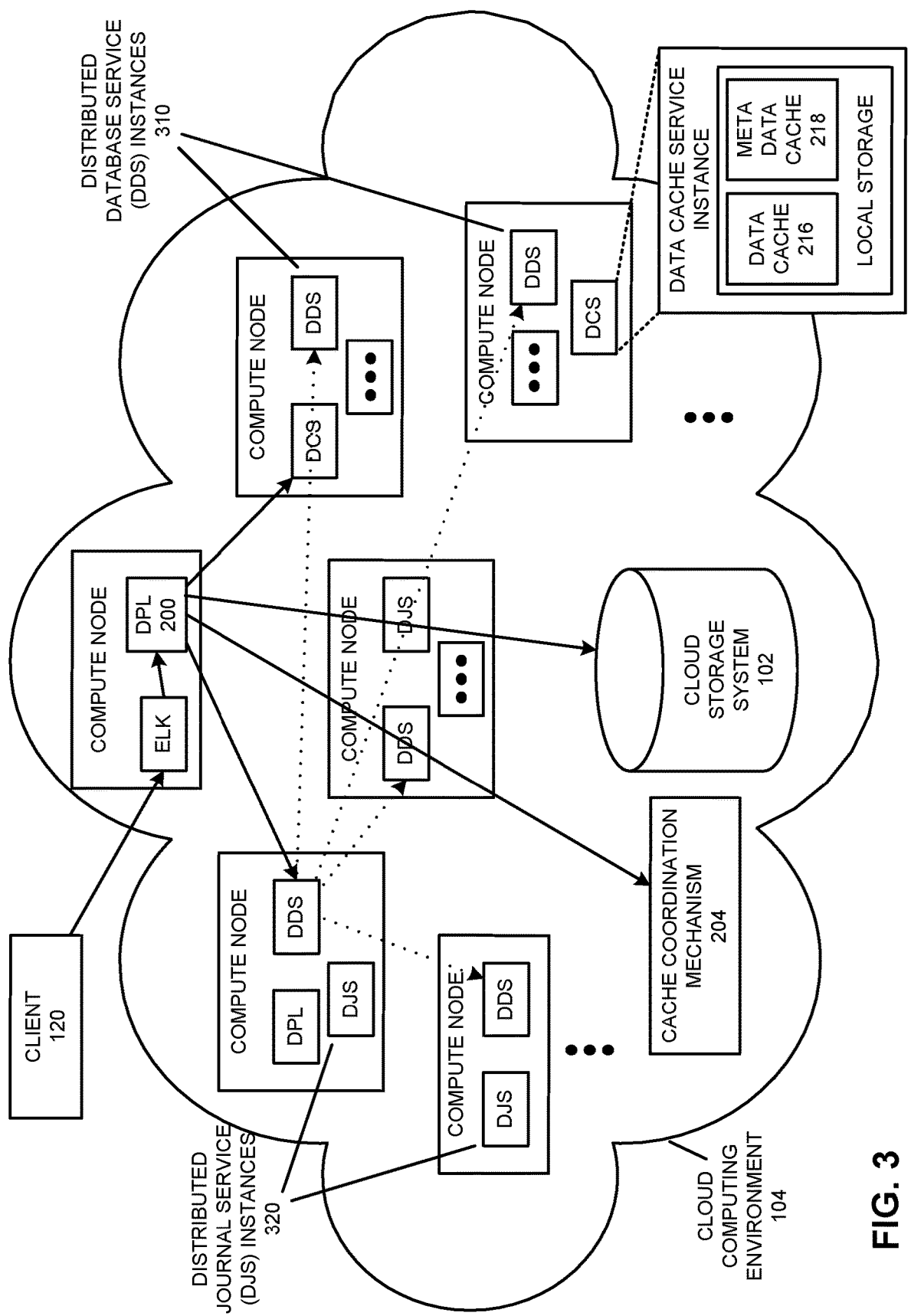
FIG. 3 illustrates the cloud computing environment of FIGS. 2A-2B in more detail in accordance with an embodiment.

FIGS. 2A-2B illustrate several exemplary data operations from the viewpoint of a single DPL service instance 200. FIG. 3 illustrates the cloud computing environment in more detail. More specifically, FIG. 3 illustrates: multiple DPL service instances (labeled "DPL"); that the previous abstraction of a distributed database service actually comprises a large number of distributed database service instances 310 (each labeled "DDS"); a set of distributed journal service instances 320; and a number of distributed data cache service instances (each labeled "DCS"). Multiple DPL service instances can run concurrently, all accessing the distributed cache service. Note that cache coordination mechanism 204, while still illustrated as a single entity, may also comprise additional distributed cache infrastructure that is distributed across a set of multiple service instances that execute on multiple compute nodes.

Note that data and metadata that are cached in the distributed cache nodes will age out and be replaced over time depending on client data accesses. For instance, LRU (last-recently-used) or other cache eviction techniques can be used to make space in a full cache node when new data is received. Old cache contents that are no longer being used will age out naturally, and DPL service instances do not need to contact cache nodes to remove obsolete data and metadata that is no longer referenced in an updated mapping. However, because of the latency associated with writing to distributed database service 220 and cloud storage system 102, situations can arise where cached entries are evicted before their associated metadata or data entries have been successfully written to the distributed database service and cloud storage system.

Figure 4:
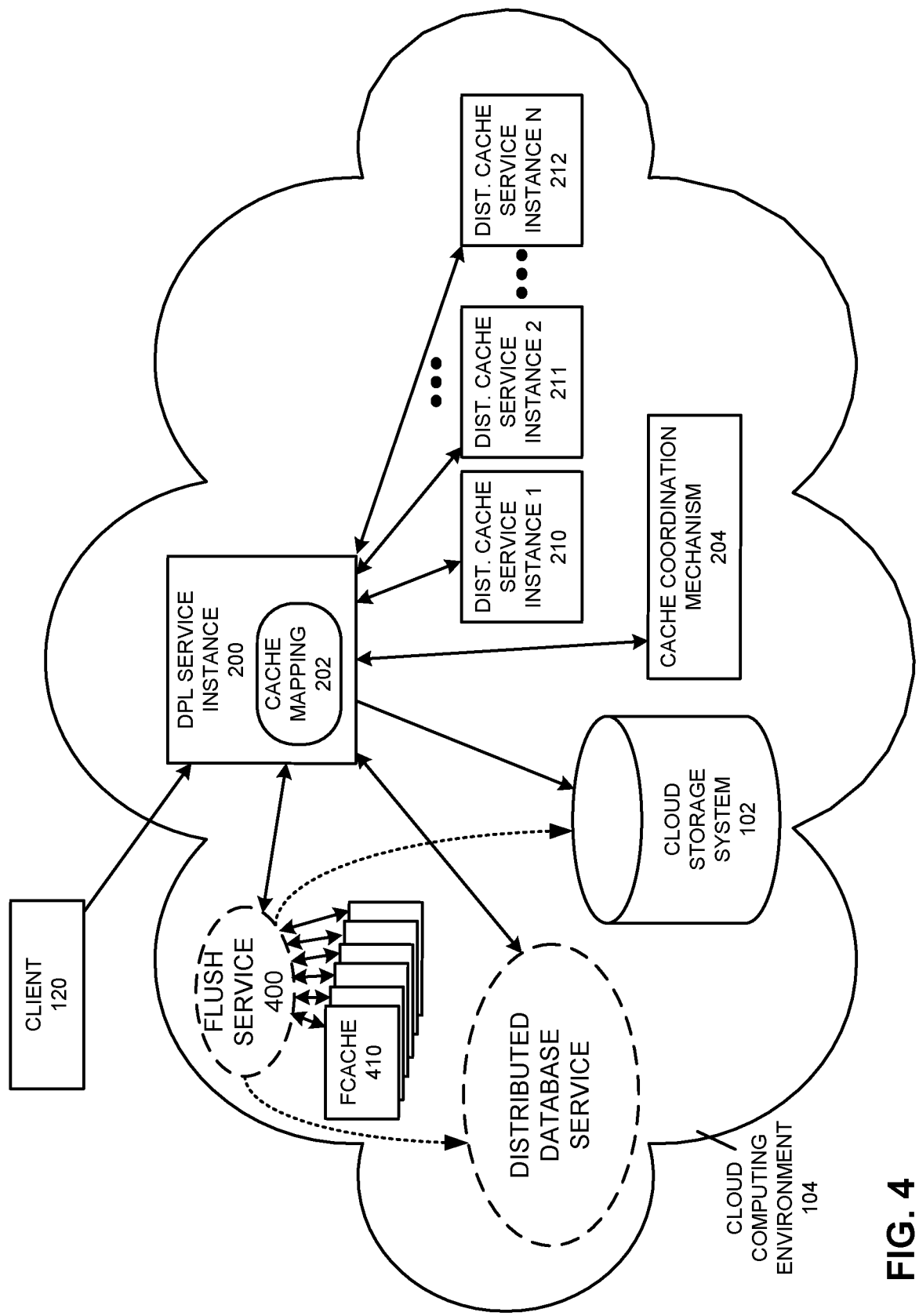
FIG. 4 illustrates an exemplary flush service that receives writes from a DPL service instance in accordance with an embodiment.

In some embodiments, metadata and data writes are routed through a flush cache service that allows written information to still be accessed during the time interval in which that information has not yet been successfully written to the distributed database service and/or cloud storage system. More specifically, the distributed cache provides "scale-out" caching capabilities that can extend and shrink easily depending on cache load and resource availability, but cannot guarantee availability for the entire time interval during which a written record is written to the distributed database and/or cloud storage system; the flush cache provides this guarantee. Note that the flush cache service only needs to cache the newly written information until the underlying write has been confirmed by the write target. FIG. 4 illustrates an exemplary flush service 400 that receives writes from DPL service instance 200 and stores the written data/metadata in one or more flush cache instances (e.g., fcache 410) until the write has been confirmed as successful. In some embodiments, on a distributed cache miss, DPL service instance 200 may be configured to submit a request to flush service 400 in parallel with requests to distributed database service 220 and/or cloud storage system 102 to ensure that the most recent version of the item that is being requested is retrieved. Alternatively, in some embodiments the distributed cache service may instead be configured to interact with the distributed database service and cloud storage system directly to perform similar capabilities (e.g., pinning newly-written data in their respective caches until the host caches receive successful write confirmations).

While the preceding examples describe high-level aspects of distributed cache reads and writes, there are additional distributed environment complexities that relate to handling changes to the participating set of cache nodes and the resulting changes to the cache mapping over time. In some embodiments, the distributed cache is a "scale-out" cache that can extend and shrink easily depending on cache load and resource availability. As described above, techniques such as consistent hashing can be used to reduce the changes that need to be made to the cache mapping when the cache is extended (e.g., adding more nodes) or shrunk (e.g., when nodes fail or are removed). However, during such events the cache mapping may need to be changed; one option would be to force all of the DPL service instances to halt and all synchronously update their respective local cache mappings, but this would involve pausing the distributed cache service and potentially severely disrupting client performance. Hence, in some embodiments, the distributed cache is designed to allow cache clients (e.g., DPL service instances) to continue to use old mappings until they can eventually update their mapping (e.g., asynchronously, with each cache client, on its own schedule, periodically checking for and downloading updates from a known location where updated shared cache mappings are published). Allowing cache clients to use different cache mappings allows the distributed cache to be extended or shrink very easily, but involves leveraging some additional techniques to ensure correct operation.

Cache clients with outdated cache mappings do not cause any issue in correctness for cached data, because an obsolete mapping cannot lead to incorrect data blocks being retrieved for a given fingerprint. The fingerprint used as the key to access a data cache entry ensures that a record that matches the requested fingerprint is always a correct record regardless of which cache node it resides upon. Hence, no matter which mapping a DPL service instance is using, it will always either miss (e.g., if an outdated mapping incorrectly identifies a cache node that under the outdated mapping previously cached the requested data block but no longer does) or get the correct data if the fingerprint matches a data cache entry on the indicated cache node (e.g., an outdated mapping incorrectly identifies a cache node that previously cached the requested data block, and that cache block has not yet been replaced in that cache node's data cache yet). Note that because data blocks are indexed by their fingerprints, duplicate data blocks are automatically written to and read from the same data cache (barring cache mapping changes), providing automatic, transparent deduplication.

However, using stale (outdated) mappings to access a metadata cache can lead to incorrect data accesses, because metadata may be changed when the data block that is associated with a specific offset of a given mode's volume range is overwritten. Tables 3 and 4 illustrate two examples of serious issues that can arise. In Table 3, a first DPL instance (DPL #1) writes a metadata entry to cache node 1 following the current mapping (mapping #1), but after a mapping update a second DPL instance's (DPL #2) write of updated metadata for a replacement data block is now routed to cache node 2 by the updated mapping (mapping #2). Another DPL instance (DPL #3) that is still using the old mapping (mapping #1) would still access cache node 1 to retrieve the old metadata and get an obsolete record and data fingerprint (fp1). This illustrates problems that can arise if not all of the DPL service instances update cache mappings promptly. However, problems can still arise even if all of the DPL service instances update their cache mappings promptly. Table 4 illustrates a similar example, but now at time t4 mapping #2 is replaced by mapping #3, which returns to mapping (rnode1,offset1) to cache node 1 (instead of to cache node 2, as in mapping #2). While forcing all cache nodes to halt and update cache mappings and flush any cache records that are affected by changes (or flush all cache records!) would alleviate such problems, this would substantially degrade cache performance.

TABLE 3

| | |
|---|---|
| Time t1: | DPL#1 uses mapping #1, saves (rnode1,offset1,fp1) −> cnode 1 |
| Time t2: | mapping #1 becomes outdated, mapping #2 is now current |
| Time t3: | DPL#2, uses mapping #2, overwrites the data at rnode1,offset1 Saves (rnode1,offset1,fp2) −> cnode 2 |
| Time t4: | DPL#3, uses (obsolete) mapping #1, fetches (rnode1, offset1) from cnode 1, gets an obsolete record and data fingerprint |

TABLE 4

| | |
|---|---|
| Time t1: | DPL#1 uses mapping #1, saves (rnode1,offset1,fp1) −> cnode 1 |
| Time t2: | mapping #1 becomes outdated, mapping #2 is now current |
| Time t3: | DPL#2, using mapping #2, writes new data to rnode1, offset1 − Saves (rnode1,offset1,fp2) −> cnode 2 |
| Time t4: | mapping #2 becomes outdated, mapping #3 is now current |
| Time t5: | DPL#3, using mapping #3, fetches (rnode1, offset1) from cnode 1, gets an obsolete record and data fingerprint |

In some embodiments, metadata entries in the distributed cache include version information that can be leveraged to ensure that metadata that is being retrieved from a cache node is not stale. For instance, each DPL instance can be configured to include a "range cache" that tracks the version of each address (e.g., each mode and offset combination) that has been accessed by that DPL instance. The metadata entries in the cache nodes' metadata caches include each given entry's version number; the version number from a DPL instance's range cache can be compared with the version number in a requested metadata cache entry to confirm that the cached metadata entry is still valid. The range cache can be stored in the memory of the DPL instance's host node, and accessed when the DPL instance looks up the mode number that is associated with a given I/O access.

In some embodiments, version numbers are compared during metadata read and/or write accesses to ensure that the metadata being accessed from a cache node is not stale. For instance, in some embodiments DPL instances may each individually track which metadata versions they have accessed, and provide such version information to cache nodes during metadata accesses to ensure that the accesses do not involve stale data. In some alternative embodiments, DPL instances may also collaboratively and/or collectively track version information (for instance, using a shared store such as etcd) to ensure that multiple accesses from different sources do not result in metadata staleness issues.

Tables 5-7 illustrate pseudocode for several exemplary metadata operations in a configuration in which DPL instances individually track version information for metadata accesses. For instance, each mode and offset combination may be assigned an initial version of '1' when it is created, and each respective version value is then increased every time its associated metadata entry is written with a new value. Note that the version information for each metadata entry is also written to the distributed database (and the flush service) every time it is modified, to (1) load the correct version information into a DPL instance's range cache the first time the DPL instance accesses a given mode/offset and (2) ensure that subsequent metadata misses in the distributed cache that result in reads from the distributed database include the correct version number. A new DPL instance will typically need to populate its local range cache with version information from the distributed database as it accesses data on behalf of clients fairly quickly; reads from the distributed database are typically much faster than writes (because reads do not require contacting a quorum set of nodes). Any subsequent time the DPL instance requests from the distributed database a metadata entry that missed in the distributed cache the DPL instance also re-loads and checks the version number to confirm that it is valid.

Table 5 includes pseudocode for some of the operations that occur during a write to a cache node (DCN1) that is triggered by a write request from a DPL instance. If the metadata that is being written (for model) does not presently exist on the indicated cache node DCN1, the DPL looks up its local version in its range cache (RC), increments the version number, and updates the RC. If a previous version exists in DCN1 (e.g., if the version number for model on DCN1 is less than the version number in the range cache), the previous (stale) metadata entry for model in DCN1 is invalidated. If the version information in the RC is less than the version in DCN1 (e.g., if the DPL previously crashed before updating the version number in the RC), the RC is updated to reflect the correct new version number. Note that depending on implementation choices version comparisons may be performed on one or both of the receiving cache node or the requesting DPL instance.

TABLE 5 put_write_rnode: // this write to cache is triggered by a put (i.e. write) request
    if (rnode1 does not exist on DCN1) {
        fetch rnode1 version from the DPL range cache (RC)
        increase the version by one
        update RC with this new rnode_version.

TABLE 5-continued

```
} else { // previous version exists in DCN1
    compare rnode1 version from RC with rnode1 version in DCN1
    if ( DPL RC rnode1 version > DCN1 rnode1 version) {
        // more recent RC version means rnode1 on DCN1 is
        obsolete
        invalidate rnode1 entry on DCN1
        goto put_write_rnode( ) // now try writing again
    } else if ( DPL RC rnode1 version < DCN1 rnode1 version) {
        // DPL RC previously not updated (e.g., DPL crash)
        update DPL RC with the new rnode_version.
    }
}
do_write( ); // versions are correct(ed), now perform the actual write
```

Table 6 includes pseudocode for some of the operations that occur during a write to a cache node (DCN1) that is triggered by a read request from a DPL instance. For instance, a read that missed in DCN1 may trigger a read request from the distributed database, and then write the mode entry that was retrieved from the distributed database into the distributed cache. If the version number associated with the metadata entry from the distributed database matches the version in the DPL RC, then the loaded entry can be written to the distributed cache (e.g., to DCN1). If, however, the database version is lower than the DC version, it could indicate that there is a more recent version that exists (e.g., that should be accessed via the flush service instead) or that the DPL instance previously crashed before its version number was updated.

TABLE 6

```
get_write_rnode: // triggered by read request - this means the read
                 // missed in cache, so get from dist. DB + write to cache
    check DPL RC rnode1 version with dist. DB rnode1 version
    if (they are the same) {
        do_write( ); // write rnode1 entry to DCN1 after reading from
        DB
    } else {
        do nothing // DB outdated, don't write cache, get from flush
        service
    }
```

Table 7 includes pseudocode for some of the operations that occur during a read from a cache node (DCN1) that is triggered by a read request from a DPL instance. If the version number associated with the metadata entry in the cache node matches the version in the DPL RC, then the entry can used by the DPL. Otherwise, the cached version is stale (e.g., due to a mapping change) and the cache entry is invalided.

TABLE 7

```
read_rnode:
    if (rnode1 present in DCN1) {
        compare DPL RC rnode1 version with DCN1 metadata cache
        version
        if (they are the same)
            do read // version in cache is up to date, proceed
        else if (DPL RC rnode1 version > DCN1 metadata cache
        version)
            invalidate rnode1 entry; // cache version is outdated
    }
```

Note that in the preceding versioning example, versioning is done at mode granularity, not at the granularity of individual blocks. In some embodiments, substantially similar techniques can also be applied at the individual block level as well; such techniques may involve tracking and managing additional block-level version information.

Figure 6:
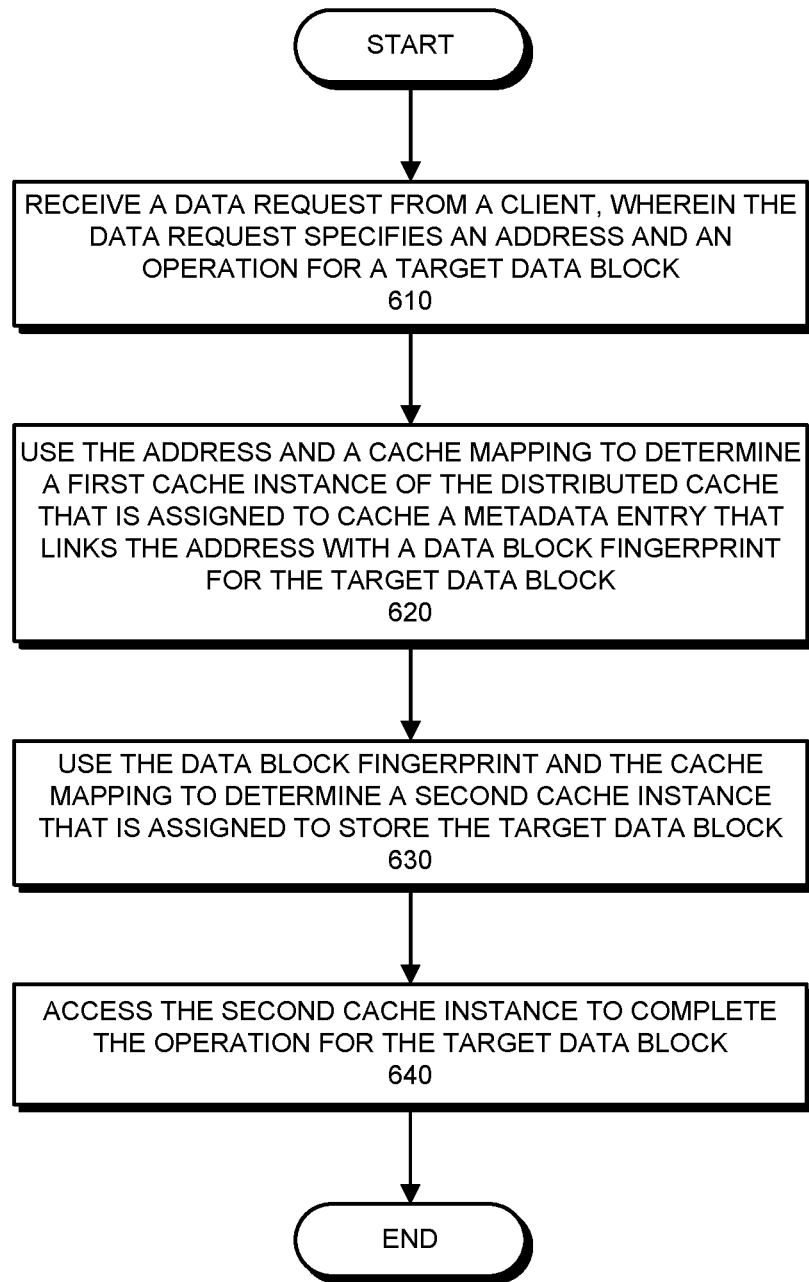
FIG. 6 presents a flow chart that illustrates the process of managing a distributed cache in a cloud-based distributed computing environment in accordance with an embodiment.

FIG. 6 presents a flow chart that illustrates the process of managing a distributed cache in a cloud-based distributed computing environment (CBDCE). As described above, the CBDCE comprises multiple compute nodes, and the distributed cache comprises multiple distributed cache instances that execute on multiple compute nodes in the CBDCE. A cache mapping determines how cached data is distributed across the multiple distributed cache instances. During operation, an instance of a data processing layer service (DPL) receives a data request from a client (operation 610); the data request specifies an address and an operation for a target data block. The DPL instance uses the address and the cache mapping to determine a first cache instance of the distributed cache that is assigned to cache a metadata entry that links the address with a data block fingerprint for the target data block (operation 620). The DPL instance then uses the data block fingerprint and the cache mapping to determine a second cache instance that is assigned to store the target data block (operation 630), and then accesses the second cache instance to complete the operation for the target data block (operation 640). Note that in some scenarios, the cache mapping may map both the address and the data block fingerprint to the same cache instance.

Note that in some embodiments, both metacache and data cache look-ups leverage consistent-hashing techniques to determine how requests are mapped to target cache nodes. Meta cache look-ups involve looking up and/or calculating an ridentifier number (that is based on one or both of an mode identifier and an offset into the specified mode) that is then hashed, while data cache look-ups use a fingerprint of the target data block for hashing. In some implementations, the system further leverages the range cache to look up an ridentifier number during a metadata cache lookup. For instance, the ridentifier lookup can be retrieved from the range cache while also looking up the version number that is associated with the target (rnode,offset) pair. Table 8 illustrates the keys that are used to perform the three successive lookups in such implementations.

TABLE 8

| (rnode, offset) | --> | ridentifier (local Range Cache lookup), mode version |
|---|---|---|
| ridentifier | --> | fp (by hashing ridentifier to find metadata entry from metadata cache) |
| fp | --> | data block (by hashing fp to find entry in data cache) |

Scale-Out Block Interface

Different client applications may have widely different data access needs that benefit from different data abstractions and data access APIs. The above-described distributed cache can flexibly and concurrently support different types of data interactions for a wide range of clients, applications, and system configurations. Multiple different types of data access interfaces can be stacked on top of the data processing layer (DPL) service to provide varied data access capabilities. For instance, an object interface service (as described in more detail in above-referenced patent application Ser. No. 16/216,890) may support a limited set (or a superset!) of object-based requests from a client, and perform some initial processing upon these requests to transform them into data accesses that are routed to a DPL service instance. The DPL service instance then manages how the object data is stored into (or accessed from) the distributed cache system, cloud storage system, and distributed database service. Alternatively, a filesystem interface service may support POSIX filesystem operations to provide a cloud-based filesystem abstraction for clients that are implemented to access data using a file abstraction. In another example, a block interface service can provide an abstraction of raw, unstructured data that can be structured and manipulated by clients. Applications such as databases can leverage a block interface abstraction to structure and manage their own data layouts based on the specific characteristics (e.g., based on the specific table structure and table size for a database) of the data they are storing; providing a cloud-based block interface enables an abstraction of storage that can be structured and expanded ("scaled-out") as needed based on client needs.

One example of an application that can use a scale-out block interface is the ELK stack. The ELK stack consists of three packages (Elasticsearch, Logstash, and Kibana) that are often leveraged to perform data analytics. More specifically, the Elasticsearch tool can scalably perform data extraction and search upon structured and unstructured data sources, Logstash can extract and process log data from a range of sources, and Kibana can be used to visualize trends and patterns in the data gathered by Elasticsearch and Logstash. These tools can operate together to gather and then analyze a shared block of target data. In a non-cloud environment such tools typically are configured to use a filesystem interface (e.g., an ext4 filesystem interface) to structure and manage a portion of a physical block storage device. In some embodiments, these tools are instead executed in a cloud computing environment, where they access a similar interface but the block storage device is instead a block interface service that stores the data into a cloud storage system. Note that while a number of the following examples are based on an ELK stack, the underlying scale-out block interface can be configured to support other databases (e.g., MySQL) and any other applications that are configured to allocate their own block storage and then manage their own data structures within that block storage.

In some embodiments, a multi-node cluster that leverages the previously-described multi-node distributed management techniques (and possibly also leverages a time-series database) is configured to provide distributed ELK stack capabilities. For instance, multiple nodes in the cluster may be configured to execute instances of the Elasticsearch distributed search engine to organize, manage, and provide search capabilities for a set of data (e.g., a set of data associated with an enterprise). These instances manage their own internal cluster-based database to manage search data; this search data is stored in the cloud storage system via the DPL service, which caches blocks in the distributed cache service to improve ELK stack data performance.

Consider, for instance, the previously-mentioned video search application (described in more detail in above-referenced patent application Ser. No. 16/216,890) that executes in the cloud computing environment. In one embodiment, video tags are metadata that are associated with videos that are being recorded and/or processed. For instance, video tags may be attached to a video or one or more portions of a video to identify a geographic location, a timeframe, a person's name, or to identify anything else in the video that might be searched for (i.e., looked up) at a later time. The video tags (along with references to their specific associated video segments) from a large number of videos might be read, parsed, and then organized into an index by the Elasticsearch instances. Subsequent video searches can then access this index to search for matching videos based on a range of search keys and filters. This index is stored in the cloud storage system, and portions of the index that are currently being operated upon by an ELK stack instance that is executing in the cloud environment can be cached in distributed cache service instances to improve data access performance.

Note that such a video search application may be structured in a range of different ways. For instance, in some embodiments both the videos and the video metadata may be stored in the cloud storage environment. However, in alternative embodiments other infrastructure may be used to store the video, with the distributed database and DPL service only being leveraged to store and manage the metadata and search data. In some embodiments, a hybrid approach enables videos to be stored both in the same cluster as well as in externally-managed infrastructure. Because the system is decentralized and distributed, there are no scalability constraints; the tags for a wide range (and location) of videos can be combined into a combined index that enables a user to search upon the full namespace of all of the videos, with the search output indicating the location(s) of the search results. A user searching for videos may be directed to and connect to a graphical user interface (GUI) presented by an Elasticsearch instance in the cluster; upon entering the desired video tags, the Elasticsearch instance initiates a distributed search and returns any results via the GUI. While the preceding examples describe video tags and video search, similar techniques can be used to perform deep content search on any type of data. Furthermore, other distributed applications can be executed in the cluster environment similarly (and also simultaneously), supported by the multi-node management system, the distributed database, and the DPL service.

Figure 5A:
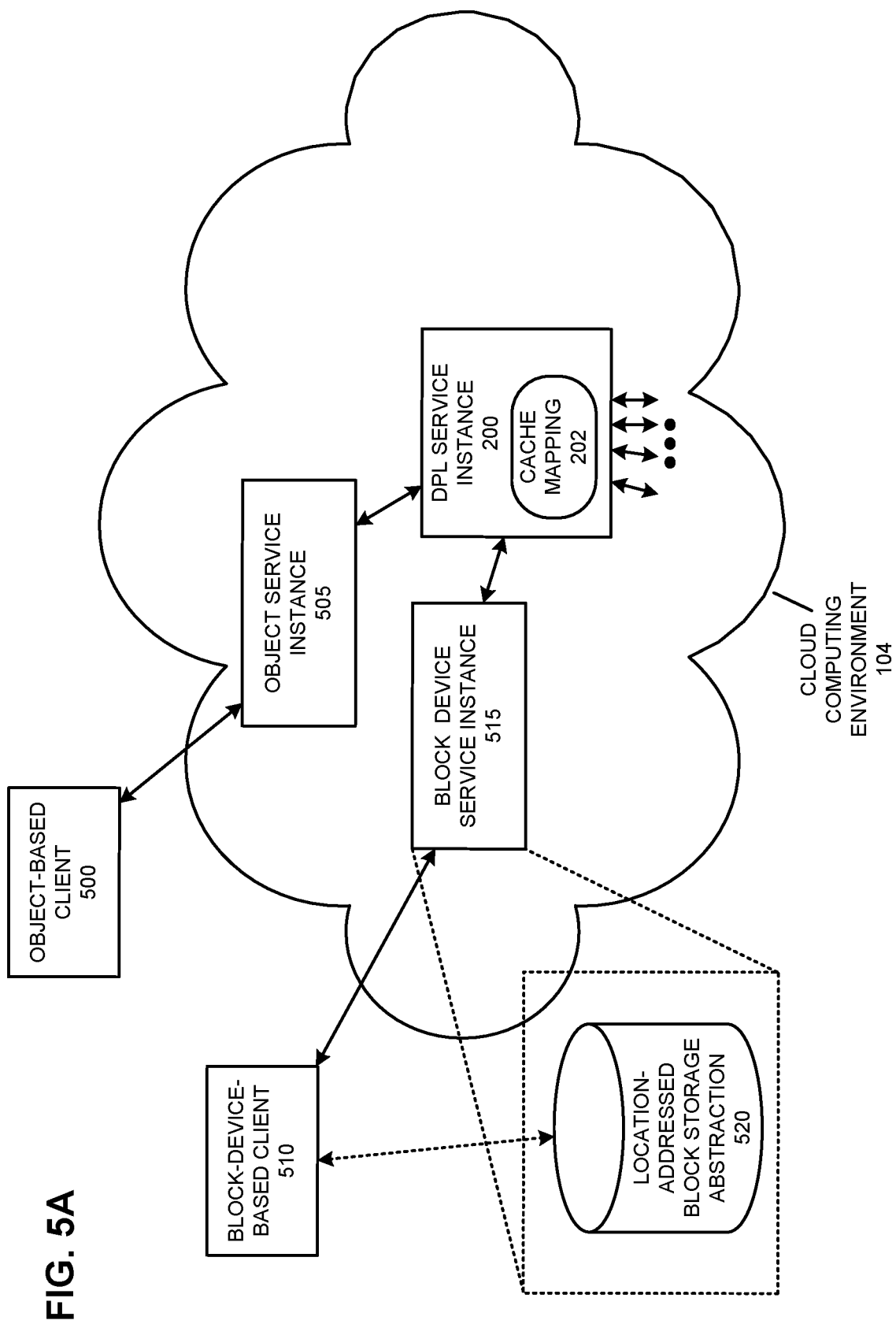
FIG. 5A illustrates several examples of different data interfaces interacting with a DPL service instance in accordance with an embodiment.
Figure 5B:
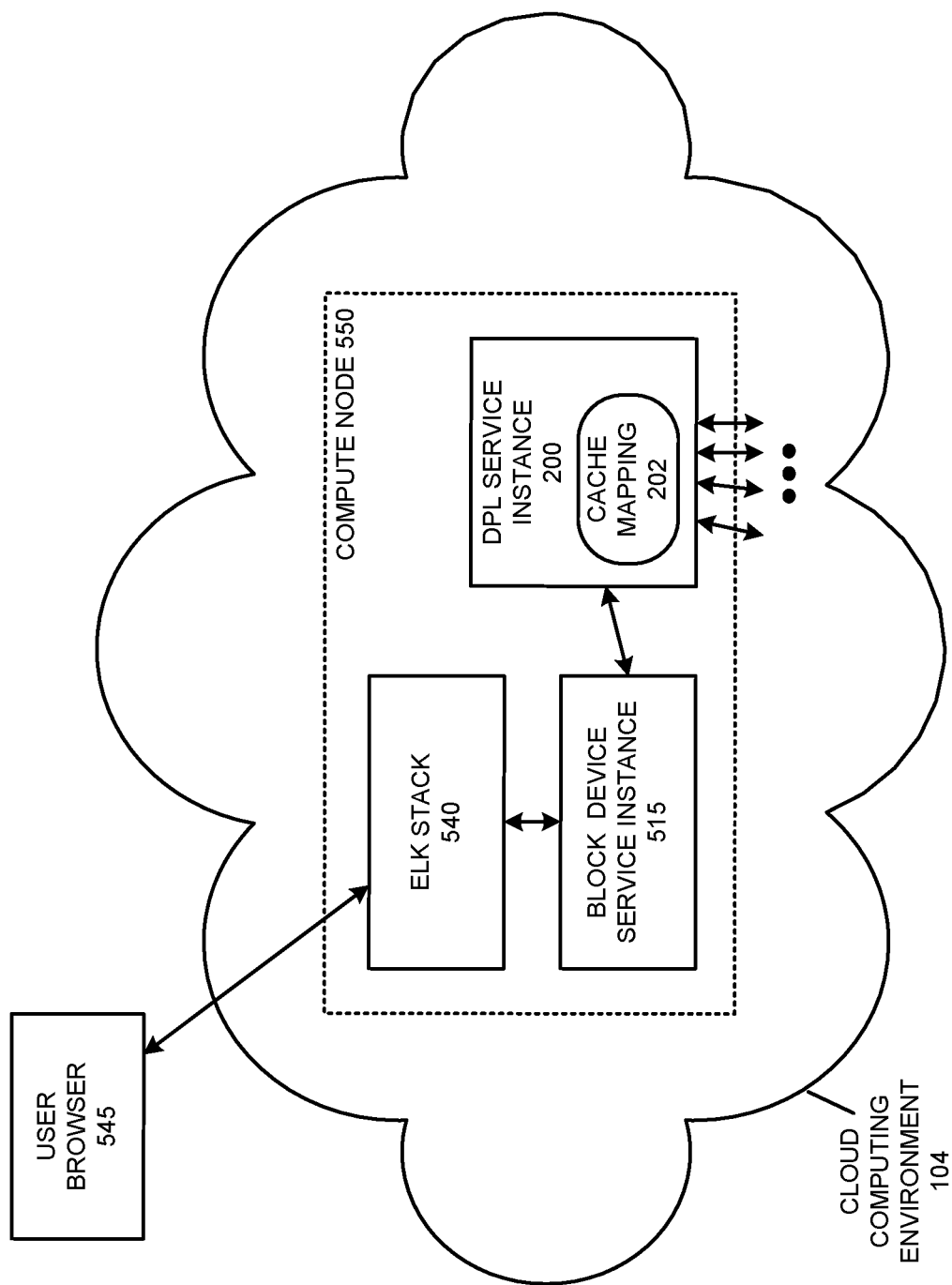
FIG. 5B illustrates an exemplary scenario in which an ELK stack, an application executing in cloud computing environment, is a client of a block device service instance in accordance with an embodiment.

FIGS. 5A-5B illustrate several examples of different data interfaces interacting with a DPL service instance 200. In FIG. 5A, an object-based client 500 and a block-device-based client 510 both access cloud-based data via DPL service instance 200. However, neither client is aware of the DPL service instance 200. Object-based client 500 interacts with an object service that provides an object-based access interface; objects that are being written are received by an object service instance 505, which conveys them as data blocks that DPL service instance 200 then stores (along with associated metadata) into the cloud storage system, distributed database, and distributed cache (as described in the previous section). Similarly, handling an object-based read request that is received by object service instance 505 involves: (1) determining in object service instance 505 the set of data blocks that are associated with the requested object; (2) requesting those data blocks from DPL service instance 200; (3) composing these data blocks into the structure of the requested object; and then (4) returning that requested object to object-based client 500.

In contrast, a block-device-based client 510 interacts with a block device service (BDS) instance 515, which provides a location-addressed block storage abstraction 520 to its clients that is substantially similar to that of a raw disk. BDS instance 515 does not understand any filesystem commands; instead, all filesystem commands are translated into disk commands (e.g., data requests) at a higher level before being sent to BDS instance 515. For instance, an application storing data via block-device-based client 510 may be given an abstraction that it is presenting filesystem commands (e.g., ext4 filesystem operations) to a local block storage device (e.g., a hard drive) of unlimited size. A filesystem driver on client 510 receiving the application data requests (i.e., ext4 filesystem commands) sends commands based on the application data requests to the operating system (e.g., Linux), which then sends corresponding data requests to BDS instance 515 (as if to a raw disk). BDS instance 515 then takes these data requests and translates and/or breaks them into a set of block interface commands and data that are then sent to DPL service instance 200, which then manages how the data is cached and stored in the cloud computing environment. Note that BDS instance 515 is at a different level of abstraction from the application on client 510, and does not understand any file system commands. The filesystem commands are translated to block-device-level (i.e., disk) commands by the operating system before they are sent to the BDS service. Note also that BDS instance 515 does not have any knowledge of the modes and blocks that DPL service instance 200 operates upon—a data request that is sent from BDS instance 515 to DPL service instance 200 includes a volume identifier (that identifies the block device that is being accessed uniquely) and an offset into that volume. DPL service instance 200 uses this information to determine one or more modes and offsets (e.g., specific blocks in the modes) that are affected by the data request (e.g., via a local range cache lookup or distributed database lookup, as needed), and then proceeds to use this mode and offset to access cache nodes, the distributed database, and/or backend storage as needed to service the data request.

While clients 500 and 510 are illustrated as being external to cloud computing environment 104 in FIG. 5A, clients to service instances 505 and 515 may be both internal and external to cloud computing environment 104. FIG. 5B illustrates a second exemplary scenario in which ELK stack 540, an application executing in cloud computing environment 104, is a client of BDS instance 515. For example, for the above-described video search example, ELK stack 540 builds and maintains a search index that from the viewpoint of ELK stack 540 is stored on a local storage drive, but is actually stored in scale-out block storage in a cloud storage system via BDS instance 515. Subsequently, when receiving search requests from clients such as user browser 545, ELK stack 540 accesses its structured index data via BDS instance 515, which translates the requested data block range into an access into the DPL (via DPL service instance 200, which accesses the distributed cache, distributed database, and cloud storage system as needed to fulfill the request).

In some embodiments, a separate, distinct block device instance is allocated to for every distinct, specific block device that is being accessed by clients. This arrangement ensures that the address ranges of different block devices are kept separate from each other and do not collide. Duplicate data stored in different block devices may automatically be deduplicated in the distributed cache (based on data block fingerprints, as described above), but each individual block device's data mappings are tracked and maintained by that block device's associated block device instance. Note that multiple clients can simultaneously access a given block device; a block device does not have any notion of data consistency, such notions are only meaningful at the application level. Any data consistency guarantees, if desired, would need to be provided at the application layer by the applications that are collaboratively operating upon a shared block device.

In some embodiments, any block device instance can contact any DPL service instance for data requests, and each DPL service instance can handle multiple block devices. In practice, for simplicity each block device instance may be configured to typically connect to only one DPL service instance at a time. Each block device instance follows a "keep-alive" protocol with the DPL service instance that it accessing data from to detect if the associated DPL service instance crashes or otherwise fails; if needed, the block device instance can find another DPL service instance to connect to on the fly. In some embodiments, a data agent service (also known as a Dagent) serves as a known mechanism that can be contacted to link incoming requests with data services and/or DPL services as needed. Upon receiving a connection request (e.g., from a new BDS instance that is requesting data services), the Dagent service determines a DPL service instance that has enough compute bandwidth to support the BDS instance and initiates a connection between that DPL service instance and the BDS instance. The Dagent service can also provide ongoing load balancing for the distributed system, detecting when specific DPL instances are overloaded and, if needed, redirecting BDS instances to access less loaded DPL services instead. The request translation operations performed by BDS instances (as intermediaries between an operating system and the DPL service) do not involve maintaining much local state, so such adjustments require low overhead. Because all of the DPL instances are clients of the shared distributed cache, previously-cached data blocks that were cached for any given block device instance can still readily be accessed via a different and/or replacement DPL service instance. Dagent operations and switch-overs between DPL service instances are transparent to the top-level application.

In some embodiments, multiple levels of service instances that collectively access the DPL are co-located on the same compute node as the DPL service instance that they are accessing when possible to improve data access performance. For instance, in FIG. 5B, ELK stack 540, BDS instance 515, and DPL service instance 200 are all co-located on the same compute node 550. Co-location with direct local communication reduces the number of network links (and overhead/latency) that need to be traversed to access data, which can substantially improve performance for data-intensive operations. Note, however, that co-location is not required—depending on compute node and cloud-computing-environment load and/or constraints one or more of applications/clients, data intermediary services (e.g., block device instances, object service instances, etc.), and DPL service instances may execute on different compute nodes from each other.

Figure 5C:
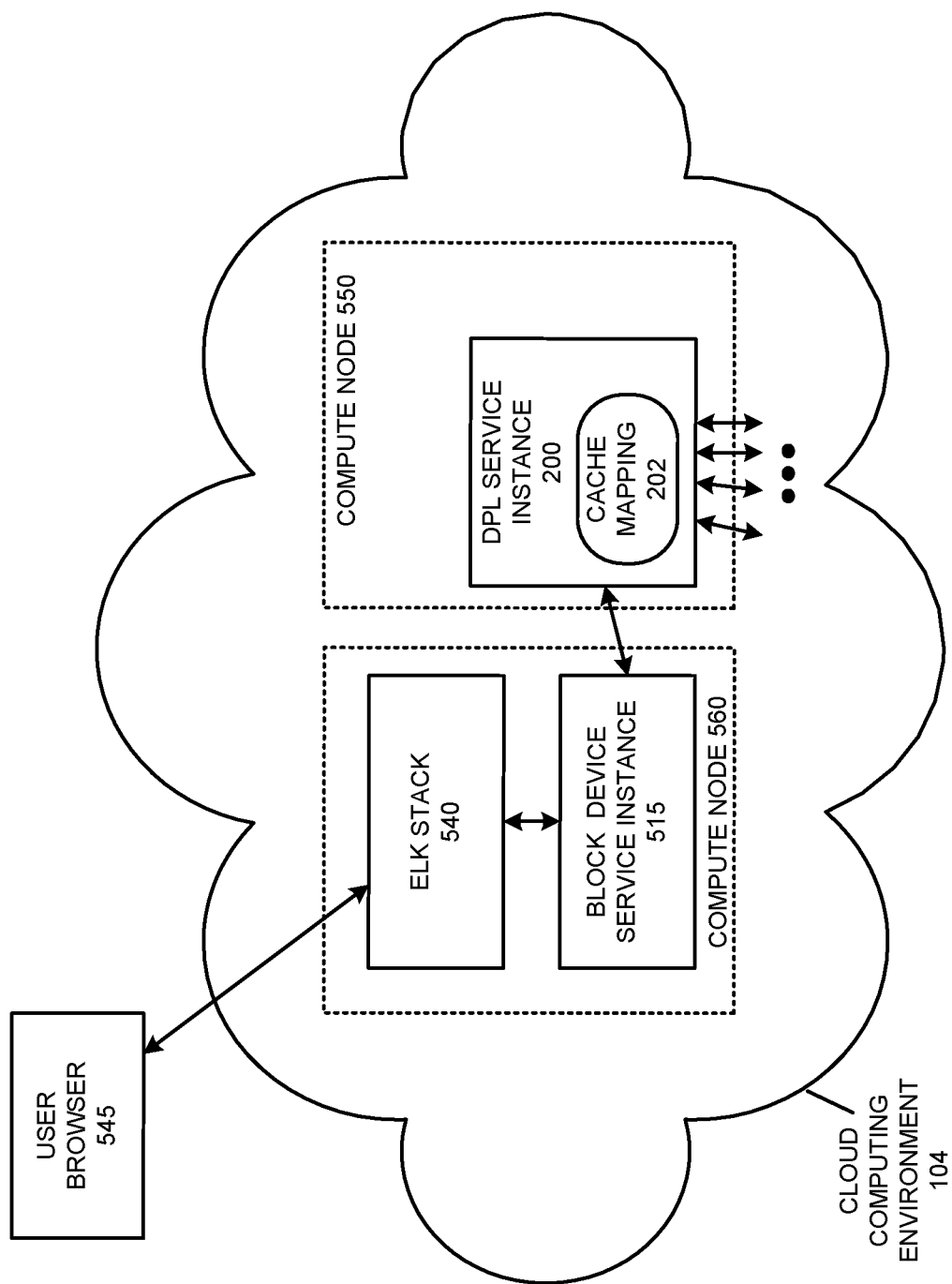
FIG. 5C illustrates a second exemplary scenario in which an ELK stack, an application executing in cloud computing environment, is a client of block device service instance in accordance with an embodiment.

In some alternative embodiments, BDS service instances are co-located with applications that are access their respective block device, but on a separate compute node from the DPL service instance that their data requests are being routed through (as illustrated in FIG. 5C, where elk stack 540 and BDS instance 515 are on a compute node 560 that is separate from compute node 550, which hosts DPL service instance 200). Such an organization can reduce resource contention and potential deadlocks. For instance, a host operating system may reach a conflictive state in which a BDS instance and a DPL service instance both need more memory to receive and process new data, and end up in a deadlock because each is waiting for the other to release memory before being able to proceed. While such deadlock can be avoided by carefully setting up operating system resources and policies, separating the two service instances ensures that such potential issues are avoided.

In some embodiments, service instance failures can lead to a migration of multiple service instances to another compute node. If a block device instance fails, a new block device instance can be allocated (and executed) to take over for the failed instance on the same node. However, if a compute node fails or becomes unstable, or multiple service instances fail, a monitoring service (e.g. a Dagent service instance) may determine that it would be beneficial to kill and restart one or more service instances on another compute node instead. For instance, in FIG. 5B, if DPL service instance 200 fails, a Dagent (not shown) may determine another host DPL service instance on another compute node, and determine that application performance would benefit most from halting the previous BDS instance 515 and ELK stack 540 and executing them on the other compute node (where they would be co-located with the new host DPL service instance). Alternatively, in FIG. 5C, if ELK stack 540 crashes, a Dagent service instance (and/or other management service) may consider the load on compute node 560 before determining whether to start a new ELK stack instance on the same node or to instantiate new ELK stack and BDS instances on another, different compute node (not shown).

While the above examples and description describe the scale-out capabilities of a BDS instance in the context of being able to support an abstraction of an arbitrarily large block storage device (limited only by the scalablility and resource provisioning of the cloud storage system and distributed database—e.g., scaling to hundreds of petabytes in size and beyond), the disclosed block interface capabilities also scale out in being able to easily support a very large number of concurrent block devices on demand. The BDS instances primarily convert raw device requests from the filesystem into block device requests that can be handled by the DPL cache service, and hence are lightweight processes that are separate from the data caching and storage lookup services. The DPL cache, flush, and journaling services also scale out (e.g., new DPL cache, flush, and journaling service instances can be added on demand), and hence the disclosed techniques can scale to support as many block devices as desired. For example, if one DPL service instance can handle on the order of 100 block devices, ten thousand DPL service instances could collectively handle 1 million block devices.

Figure 9:
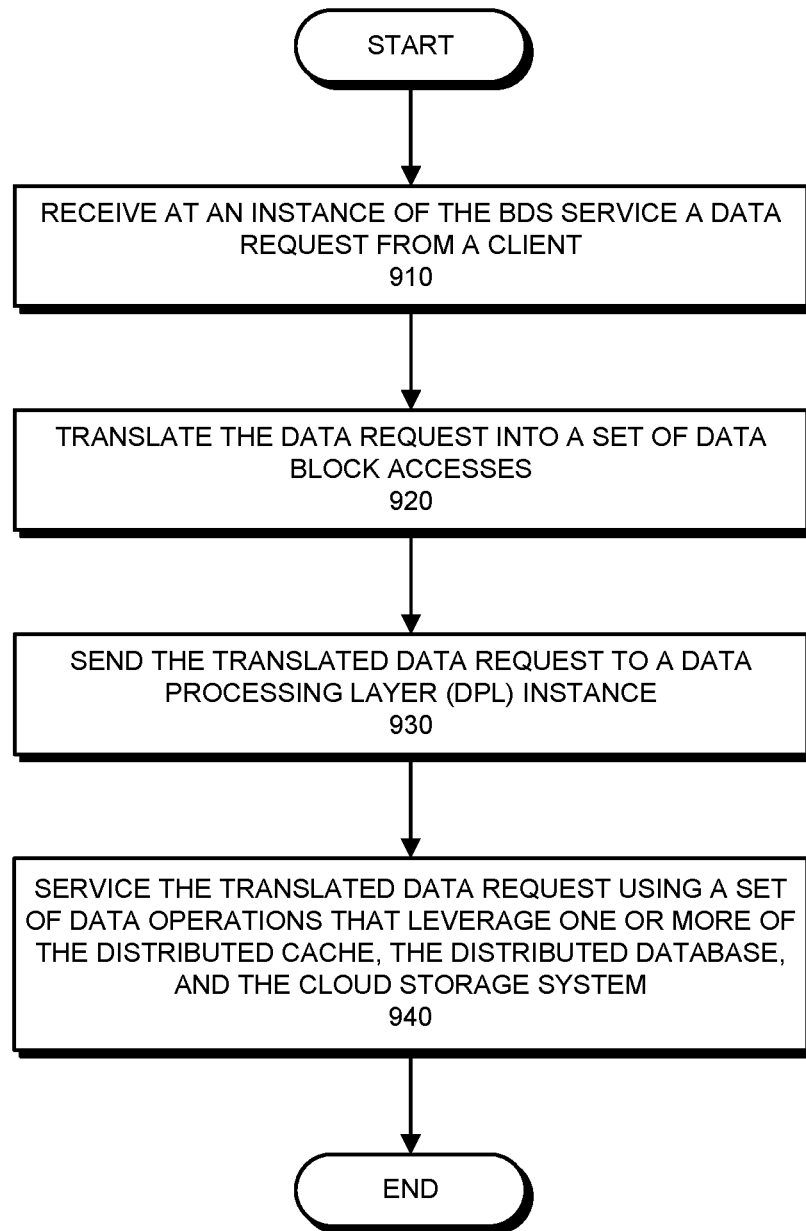
FIG. 9 presents a flow chart that illustrates the process of accessing a scale-out block interface in a cloud-based distributed computing environment in accordance with an embodiment.

FIG. 9 presents a flow chart that illustrates the process of accessing a scale-out block interface in a CBDCE. As described above, the CBDCE comprises multiple compute nodes, a distributed database, and cloud storage system, with multiple instances of a data processing layer service (DPL) managing data accesses to the distributed cache and the cloud storage system, and a block device service (BDS) presenting the scale-out block interface to clients. During operation, an instance of the BDS service receives a data request from a client (operation 910). The BDS instance translates the data request into a set of data block accesses (operation 920), and then sends the translated data request to a DPL instance (operation 930). The DPL instance services the data request using a set of data operations that leverage one or more of the distributed cache, the distributed database, and the cloud storage system (operation 940). The BDS service leverages the DPL instance to provide to the client an abstraction of a highly-available block storage device with unlimited storage space via the scale-out block interface.

In summary, a wide range of applications with different data access abstractions can be built on top of the DPL service. In one scenario, the data needs of an ELK stack access the abstraction of an unlimited-size raw device via a block device service that presents the abstraction of a local disk but leverages the highly-available, scale-out storage of an underlying cloud storage system. The following sections further describe techniques for improving the provisioning and scaling of applications in this environment.

Multi-Tenancy

In some embodiments, multi-tenancy techniques are applied to applications and infrastructure in the CBDCE to facilitate the transparent sharing of resources across multiple customers. For instance, a specific single instance of the ELK stack and a supporting distributed database may initially be shared by multiple small customers to reduce costs. Over time, as the managed set of data grows, the data sets of customers whose needs outgrow the shared infrastructure are transparently migrated from the shared environment into their own separate instances of applications and infrastructure. Such resource-sharing techniques reduce initial computing costs and overhead while still allowing customers to scale on demand as needed.

Scalable Provisioning

In some embodiments, dynamic resource management techniques are applied to applications and CBDCE infrastructure to dynamically increase and decrease compute and storage capacity based on customer needs. Such techniques involve one or more of: (1) determining a set of micro services that are currently executing in the CBDCE; (2) monitoring a set of resources and executing service instances for the CBDCE; and (3) determining trigger points at which additional resources should be added (or removed) for each given service.

Computing Environment

Figure 7:
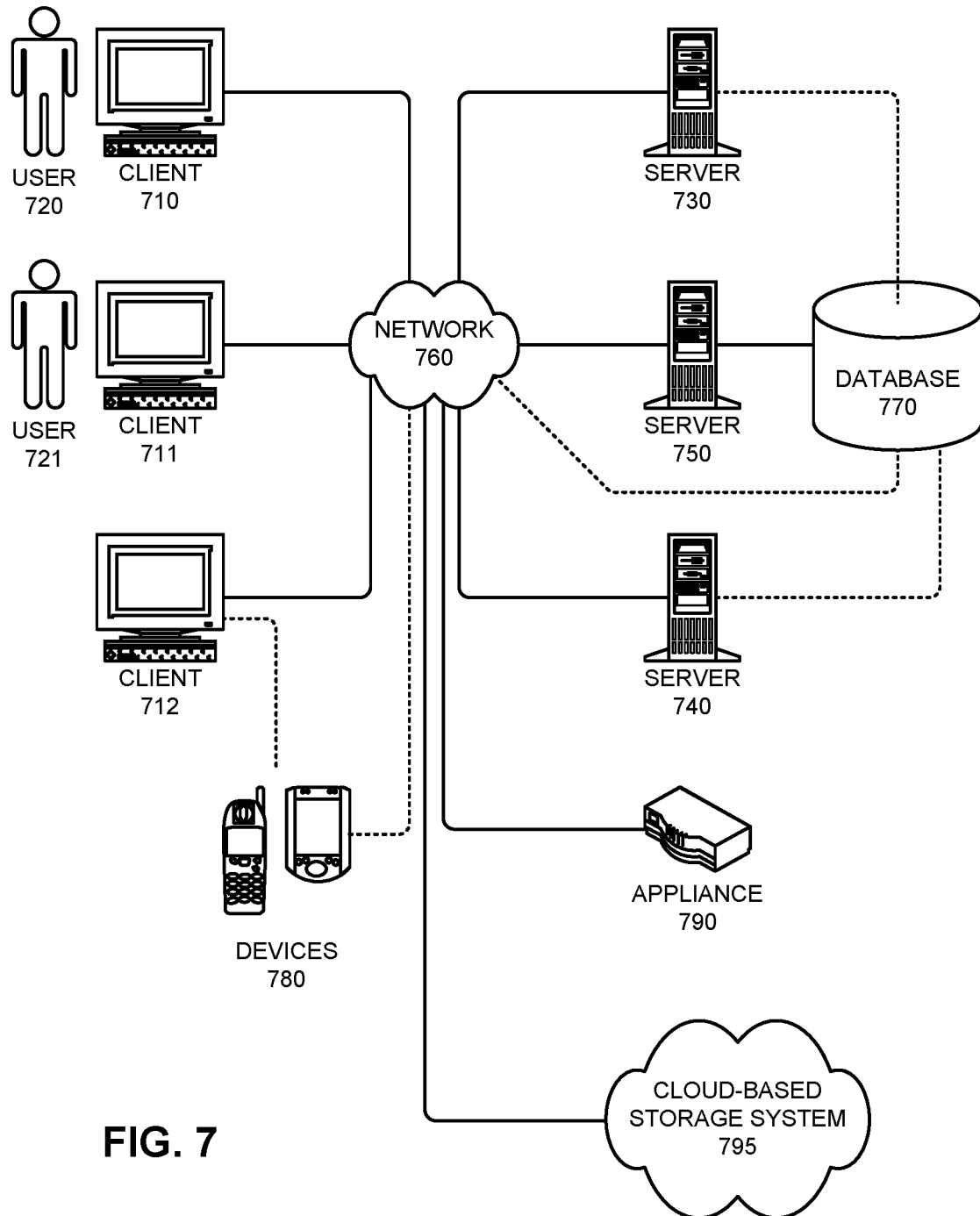
FIG. 7 illustrates a computing environment in accordance with an embodiment.

In summary, embodiments of the present invention facilitate storing and managing data in a cloud computing environment. In some embodiments of the present invention, techniques for managing and/or accessing data stored in a cloud computing environment and in a distributed cache, and accessing data via a scale-out block interface, can be incorporated into a wide range of computing devices in a computing environment. For example, FIG. 7 illustrates a computing environment 700 in accordance with an embodiment of the present invention. Computing environment 700 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 7, computing environment 700 includes clients 710-712, users 720 and 721, servers 730-750, network 760, database 770, devices 780, appliance 790, and cloud-based storage system 795.

Clients 710-712 can include any node on a network that includes computational capability and includes a mechanism for communicating across the network. Additionally, clients 710-712 may comprise a tier in an n-tier application architecture, wherein clients 710-712 perform as servers (servicing requests from lower tiers or users), and wherein clients 710-712 perform as clients (forwarding the requests to a higher tier).

Similarly, servers 730-750 can generally include any node on a network including a mechanism for servicing requests from a client for computational and/or data storage resources. Servers 730-750 can participate in an advanced computing cluster, or can act as stand-alone servers. For instance, computing environment 700 can include a large number of compute nodes that are organized into a computing cluster and/or server farm. In one embodiment of the present invention, server 740 is an online "hot spare" of server 750.

Users 720 and 721 can include: an individual; a group of individuals; an organization; a group of organizations; a computing system; a group of computing systems; or any other entity that can interact with computing environment 700.

Network 760 can include any type of wired or wireless communication channel capable of coupling together computing nodes. This includes, but is not limited to, a local area network, a wide area network, or a combination of networks. In one embodiment of the present invention, network 760 includes the Internet. In some embodiments of the present invention, network 760 includes phone and cellular phone networks.

Database 770 can include any type of system for storing data in non-volatile storage. This includes, but is not limited to, systems based upon magnetic, optical, or magneto-optical storage devices, as well as storage devices based on flash memory and/or battery-backed up memory. Note that database 770 can be coupled: to a server (such as server 750), to a client, or directly to a network. Alternatively, other entities in computing environment 700 (e.g., servers 730-750) may also store such data. Database 770 may also be a distributed time-series database.

Devices 780 can include any type of electronic device that can be coupled to a client, such as client 712. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 780 can be coupled directly to network 760 and can function in the same manner as clients 710-712.

Appliance 790 can include any type of appliance that can be coupled to network 760. This includes, but is not limited to, routers, switches, load balancers, network accelerators, and specialty processors. Appliance 790 may act as a gateway, a proxy, or a translator between server 740 and network 760.

Cloud-based storage system 795 can include any type of networked storage devices (e.g., a federation of homogeneous or heterogeneous storage devices) that together provide data storage capabilities to one or more servers and/or clients.

Note that different embodiments of the present invention may use different system configurations, and are not limited to the system configuration illustrated in computing environment 700. In general, any device that includes computational and storage capabilities may incorporate elements of the present invention.

Figure 8:
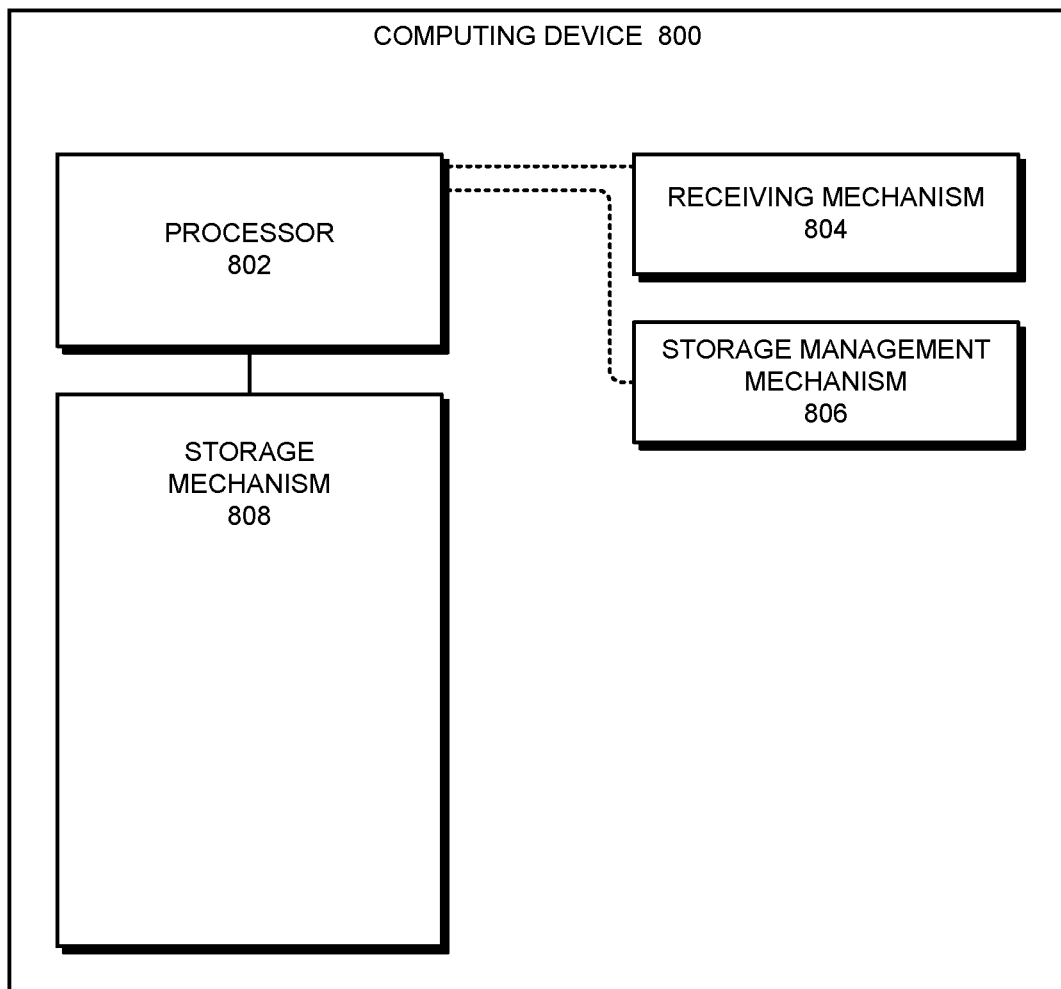
FIG. 8 illustrates a computing device in accordance with an embodiment.

FIG. 8 illustrates a computing device 800 that includes a processor 802. Computing device 800 also includes a receiving mechanism 804, a storage management mechanism 806, and a storage mechanism 808.

In some embodiments, computing device 800 uses receiving mechanism 804, storage management mechanism 806, and storage mechanism 808 to manage data and/or data requests in a cloud computing environment. For instance, storage mechanism 808 can store distributed database data that is associated with tracking the status and/or configuration of a distribute cache and/or any other storage or compute entity in the cloud-based distributed computing environment. Computing device 800 can use receiving mechanism 804 to receive a request for data in a cloud storage system, a scale-out block interface, or a distributed cache. Program instructions executing on processor 802 can be used to configure, look-up, and/or store data in a distributed cache or in a scale-out block interface, as well as to translate data requests that access a scale-out block storage service. Storage management mechanism 806 can facilitate handling and translating data requests and coordinate with other service nodes and a cloud storage system to provide further data storage capabilities and for redundancy.

In some embodiments of the present invention, some or all aspects of receiving mechanism 804, storage management mechanism 806, and/or a filesystem device driver can be implemented as dedicated hardware modules in computing device 800. These hardware modules can include, but are not limited to, processor chips, application-specific integrated circuit (ASIC) chips, field-programmable gate arrays (FPGAs), memory chips, and other programmable-logic devices now known or later developed.

Processor 802 can include one or more specialized circuits for performing the operations of the mechanisms. Alternatively, some or all of the operations of receiving mechanism 804, storage management mechanism 806, and/or a filesystem device driver may be performed using general-purpose circuits in processor 802 that are configured using processor instructions. Thus, while FIG. 8 illustrates receiving mechanism 804 and/or storage management mechanism 806 as being external to processor 802, in alternative embodiments some or all of these mechanisms can be internal to processor 802.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for accessing a scale-out block interface in a cloud-based distributed computing environment (CBDCE), the method comprising:
   receiving at a block device service (BDS) instance a data request from a client, wherein the CBDCE comprises multiple compute nodes, a distributed cache, a distributed database, and a cloud storage system, wherein a data processing layer service (DPL) comprising multiple DPL instances manages data accesses to the distributed cache and the cloud storage system, wherein the BDS instance presents the scale-out block interface to the client;
   in the BDS instance, translating the data request into a set of data block accesses;
   sending the translated data request from the BDS instance to a DPL instance, wherein the DPL instance services the data request using a set of data operations that leverage at least one of the distributed cache, the distributed database, and the cloud storage system;
   detecting that the BDS instance and the DPL instance are co-located on a first compute node and that the BDS instance and the DPL instance are in a deadlock that requires memory to be released before either of the BDS instance or the DPL instance are able to proceed;

determining a second DPL instance executing on a second compute node distinct from the first compute node; and configuring the BDS instance to route the translated data request and subsequent requests for the BDS instance to the second DPL instance to prevent any issues associated with resource contention between the DPL instance and at least one of the BDS instance and the client;

wherein a BDS service leverages the data processing layer service to provide to the client an abstraction of a highly-available block storage device with unlimited storage space via the scale-out block interface;

wherein the highly-available block storage device supports a video-search application that stores video tags for videos that are being recorded and processed;

wherein the client comprises a search application that stores and searches structured video tag data stored in the highly-available block storage device, a log-extraction application that extracts and processes video tag log data stored in the highly-available block storage device, and a visualization application that visualizes trends and patterns for video tag data stored in the highly-available block storage device;

wherein the client generates and operates upon a data index of video tag metadata that is stored in the cloud storage system via the scale-out block interface provided by the BDS instance;

wherein a portion of the data index that is currently being operated upon by the client is cached in the distributed cache; and wherein the data request is a video search comprising a range of search keys and filters, the search application accesses the data index to search for videos that match the range, and the data index is used to determine a location of matching videos in the cloud storage system.

2. The computer-implemented method of claim 1, wherein the client is an application that presents a filesystem-level request to a host operating system of a host compute node;

wherein the host operating system translates the filesystem-level request into a disk-level command that is forwarded to the BDS instance as the data request; and wherein translating the data request in the BDS instance comprises converting, in the BDS instance, the disk-level command into data block device requests that match an application programming interface (API) of the DPL service.

3. The computer-implemented method of claim 2, wherein the DPL instance tracks a set of mode identifiers, offsets, and data fingerprints associated with data requests; and wherein the DPL uses the set of mode identifiers, offsets, and data fingerprints to determine how to access metadata and data blocks associated with the data request in the distributed cache, the distributed database, and the cloud storage system.

4. The computer-implemented method of claim 3, wherein the CBDCE supports simultaneous accesses for multiple, distinct scale-out block devices, wherein access to each distinct scale-out block device is managed by a separate, distinct BDS instance; and wherein a given DPL instance simultaneously provides data access for multiple BDS instances, wherein the DPL instances ensure that data requests for different scale-out block devices remain separate and distinct.

5. The computer-implemented method of claim 4, wherein sending the data request from the BDS instance to the DPL instance further comprises:

contacting a data agent service, wherein the data agent service tracks a set of currently executing DPL instances and links incoming requests from BDS instances with host DPL services;

wherein the data agent service determines that no existing DPL instance has sufficient bandwidth to support an additional BDS instance, and in response (1) instantiates the DPL instance as a new DPL instance to support additional BDS instances in the CBDCE and (2) establishes a connection between the BDS instance and the DPL instance to service the data request; and wherein the distributed cache, the DPL service, the distributed database and other distributed, scalable services executing in the CBDCE scale out to handle an arbitrarily large number of BDS instances.

6. The computer-implemented method of claim 4, wherein sending the data request from the BDS instance to the DPL instance further comprises:

contacting a data agent service, wherein the data agent service tracks a set of currently executing DPL instances and links incoming requests from BDS instances with host DPL services;

wherein the data agent service determines that the DPL instance has sufficient bandwidth to support an additional BDS instance and establishes a connection between the BDS instance and the DPL instance to service the data request; and wherein the data agent service rebalances BDS instance requests to DPL instances over time to ensure that all of the DPL instances in the CBDCE have balanced workloads.

7. The computer-implemented method of claim 6, wherein the data agent service co-locates the client and the BDS instance on a same compute node to reduce data request latency and overhead.

8. The computer-implemented method of claim 7, wherein the BDS instance maintains a keep-alive protocol with the DPL instance to promptly detect any failure in the DPL instance; and wherein if the DPL instance fails, the data agent service identifies a second available DPL instance and refers the BDS instance to the second available DPL instance.

9. The computer-implemented method of claim 8, wherein multiple instances of the search application simultaneously modify a shared scale-out block device via the BDS instance; and wherein the BDS instance does not provide data consistency guarantees for multiple clients simultaneously accessing the shared scale-out block device, and the multiple instances communicate at an application layer to collaboratively maintain data consistency for the shared scale-out block device.

10. A non-transitory computer-readable storage medium storing instructions that when executed by a computer cause the computer to perform a method for accessing a scale-out block interface in a cloud-based distributed computing environment (CBDCE), the method comprising:

receiving at a block device service (BDS) instance a data request from a client, wherein the CBDCE comprises multiple compute nodes, a distributed cache, a distributed database, and a cloud storage system, wherein a data processing layer service (DPL) comprising multiple DPL instances manages data accesses to the distributed cache and the cloud storage system, wherein the BDS instance presents the scale-out block interface to the client;

in the BDS instance, translating the data request into a set of data block accesses;

sending the translated data request from the BDS instance to a DPL instance, wherein the DPL instance services the data request using a set of data operations that leverage at least one of the distributed cache, the distributed database, and the cloud storage system;

detecting that the BDS instance and the DPL instance are co-located on a first compute node and that the BDS instance and the DPL instance are in a deadlock that requires memory to be released before either of the BDS instance or the DPL instance are able to proceed;

determining a second DPL instance executing on a second compute node distinct from the first compute node; and configuring the BDS instance to route the translated data request and subsequent requests for the BDS instance to the second DPL instance to prevent any issues associated with resource contention between the DPL instance and at least one of the BDS instance and the client;

wherein a BDS service leverages the data processing layer service to provide to the client an abstraction of a highly-available block storage device with unlimited storage space via the scale-out block interface;

wherein the highly-available block storage device supports a video-search application that stores video tags for videos that are being recorded and processed;

wherein the client comprises a search application that stores and searches structured video tag data stored in the highly-available block storage device, a log-extraction application that extracts and processes video tag log data stored in the highly-available block storage device, and a visualization application that visualizes trends and patterns for video tag data stored in the highly-available block storage device;

wherein the client generates and operates upon a data index of video tag metadata that is stored in the cloud storage system via the scale-out block interface provided by the BDS instance;

wherein a portion of the data index that is currently being operated upon by the client is cached in the distributed cache; and wherein the data request is a video search comprising a range of search keys and filters, the search application accesses the data index to search for videos that match the range, and the data index is used to determine a location of matching videos in the cloud storage system.

11. The non-transitory computer-readable storage medium of claim 10, wherein the client is an application that presents a filesystem-level request to a host operating system of a host compute node;

wherein the host operating system translates the filesystem-level request into a disk-level command that is forwarded to the BDS instance as the data request; and wherein translating the data request in the BDS instance comprises converting, in the BDS instance, the disk-level command into data block device requests that match an application programming interface (API) of the DPL service.

12. The non-transitory computer-readable storage medium of claim 11, wherein the DPL instance tracks a set of mode identifiers, offsets, and data fingerprints associated with data requests; and wherein the DPL uses the set of mode identifiers, offsets, and data fingerprints to determine how to access metadata and data blocks associated with the data request in the distributed cache, the distributed database, and the cloud storage system.

13. The non-transitory computer-readable storage medium of claim 12, wherein the CBDCE supports simultaneous accesses for multiple, distinct scale-out block devices, wherein access to each distinct scale-out block device is managed by a separate, distinct BDS instance; and wherein a given DPL instance simultaneously provides data access for multiple BDS instances, wherein the DPL instances ensure that data requests for different scale-out block devices remain separate and distinct.

14. A system in a cloud-based distributed computing environment (CBDCE), wherein the CBDCE comprises multiple compute nodes, a distributed cache, a distributed database, and a cloud storage system, wherein a data processing layer service (DPL) comprising multiple DPL instances manages data accesses to the distributed cache and the cloud storage system, comprising:

a client; and a computer node, comprising:

a processor that supports executing multiple different service instances in distinct virtual machines; and a storage management mechanism;

wherein the compute node is configured to use the processor to execute a block device service (BDS) instance that presents a scale-out block interface to the client to provide to the client an abstraction of a highly-available block storage device with unlimited storage space;

wherein the BDS instance, upon receiving a data request from the client, is configured to:

use at least one of the processor and the storage management mechanism to translate the data request into a set of data block accesses;

send the translated data request to a DPL instance, wherein the DPL instance services the data request using a set of data operations that leverage at least one of the distributed cache, the distributed database, and the cloud storage system;

detect that the BDS instance and the DPL instance are co-located on the compute node and that the BDS instance and the DPL instance are in a deadlock that requires memory to be released before either of the BDS instance or the DPL instance are able to proceed;

determine a second DPL instance executing on a second compute node distinct from the compute node; and configure the BDS instance to route the translated data request and subsequent requests for the BDS instance to the second DPL instance to prevent any issues associated with resource contention between the DPL instance and at least one of the BDS instance and the client wherein the highly-available block storage device supports a video-search application that stores video tags for videos that are being recorded and processed;

wherein the client comprises a search application that stores and searches structured video tag data stored in the highly-available block storage device, a log-extraction application that extracts and processes video tag log data stored in the highly-available block storage device, and a visualization application that visualizes trends and patterns for video tag data stored in the highly-available block storage device;

wherein the client generates and operates upon a data index of video tag metadata that is stored in the cloud storage system via the scale-out block interface provided by the BDS instance;

wherein a portion of the data index that is currently being operated upon by the client is cached in the distributed cache, and wherein the data request is a video search comprising a range of search keys and filters, the search application accesses the data index to search for videos that match the range, and the data index is used to determine a location of matching videos in the cloud storage system.

* * * * *